United States Patent
Hayano et al.

(10) Patent No.: US 9,278,348 B2
(45) Date of Patent: *Mar. 8, 2016

(54) POLYETHER COMPOUND, CROSS-LINKABLE COMPOSITION, AND ELECTROLYTE

(75) Inventors: Shigetaka Hayano, Tokyo (JP); Hiroyuki Yonemaru, Tokyo (JP); Keisuke Ohta, Tokyo (JP)

(73) Assignee: ZEON CORPORATION, Tokyo (JP)

(*) Notice: Subject to any disclaimer, the term of this patent is extended or adjusted under 35 U.S.C. 154(b) by 60 days.

This patent is subject to a terminal disclaimer.

(21) Appl. No.: 14/008,252

(22) PCT Filed: Mar. 30, 2012

(86) PCT No.: PCT/JP2012/058609
§ 371 (c)(1),
(2), (4) Date: Sep. 27, 2013

(87) PCT Pub. No.: WO2012/133786
PCT Pub. Date: Oct. 4, 2012

(65) Prior Publication Data
US 2014/0018507 A1  Jan. 16, 2014

(30) Foreign Application Priority Data
Mar. 31, 2011 (JP) .................. 2011-081300

(51) Int. Cl.
| | |
|---|---|
| *B01J 41/12* | (2006.01) |
| *C08L 71/02* | (2006.01) |
| *C08L 71/03* | (2006.01) |
| *H01B 1/12* | (2006.01) |
| *C08G 65/14* | (2006.01) |
| *C08G 65/24* | (2006.01) |
| *C08G 65/333* | (2006.01) |
| *H01M 8/10* | (2006.01) |

(52) U.S. Cl.
CPC ............... *B01J 41/125* (2013.01); *C08G 65/14* (2013.01); *C08G 65/24* (2013.01); *C08G 65/33303* (2013.01); *C08G 65/33317* (2013.01); *C08L 71/02* (2013.01); *C08L 71/03* (2013.01); *H01B 1/127* (2013.01); *H01M 8/1025* (2013.01); *H01M 8/103* (2013.01)

(58) Field of Classification Search
CPC ........ B01J 41/125; C08L 71/02; C08L 71/03; H01B 1/127
USPC ........................................ 526/258; 548/312.7
See application file for complete search history.

(56) References Cited

U.S. PATENT DOCUMENTS

| | | | |
|---|---|---|---|
| 3,625,684 A * | 12/1971 | Sels et al. ................. 430/62 |
| 6,245,181 B1 | 6/2001 | Bright | |
| 6,376,765 B1 | 4/2002 | Wariishi et al. | |
| 2002/0043326 A1 | 4/2002 | Bright | |
| 2006/0047054 A1* | 3/2006 | Wang et al. ............. 524/495 |
| 2006/0076051 A1 | 4/2006 | Watanabe et al. | |
| 2010/0319762 A1 | 12/2010 | Watanabe et al. | |
| 2010/0326500 A1 | 12/2010 | Watanabe et al. | |
| 2012/0296049 A1 | 11/2012 | Yonemaru et al. | |
| 2013/0214209 A1 | 8/2013 | Hayano et al. | |
| 2014/0138589 A1 | 5/2014 | Hayano et al. | |

FOREIGN PATENT DOCUMENTS

| | | | |
|---|---|---|---|
| EP | 0 954 476 A1 | 9/1999 | |
| EP | 2 730 619 A1 | 4/2015 | |
| JP | 2000-508028 A | 6/2000 | |
| JP | 2001-256828 A | 9/2001 | |
| JP | 2002-038001 A | 2/2002 | |
| JP | 2002-233744 A | 8/2002 | |
| JP | 2002-246066 A | 8/2002 | |
| JP | 2004-035868 A | 2/2004 | |
| JP | 2010053217 * | 3/2010 | ............. C08G 65/12 |
| JP | WO 2012/057299 A1 | 5/2012 | |
| WO | WO 99/32521 A1 | 7/1999 | |
| WO | WO 2004/112184 A1 | 12/2004 | |
| WO | WO 2011/081152 A1 | 7/2011 | |

OTHER PUBLICATIONS

International Search Report issued in PCT/JP2012/058609, mailed on Jun. 19, 2012.
Extended European Search Report dated Apr. 30, 2015 issued in corresponding European Patent Application No. 12765450.7.

* cited by examiner

*Primary Examiner* — Ling Choi
*Assistant Examiner* — Chun-Cheng Wang
(74) *Attorney, Agent, or Firm* — Birch, Stewart, Kolasch & Birch, LLP

(57) ABSTRACT

A polyether compound containing oxirane monomer units in an average number per molecule of 5 to 200, wherein the polyether compound has a cationic group and cross-linkable group in the oxirane monomer units, and a cross-linkable composition containing this polyether compound and a cross-linking agent which enables cross-linking of the cross-linkable groups of the polyether compound are provided.

6 Claims, No Drawings

POLYETHER COMPOUND, CROSS-LINKABLE COMPOSITION, AND ELECTROLYTE

TECHNICAL FIELD

The present invention relates to a polyether compound, a cross-linkable composition which contains the same, and an electrolyte obtained by cross-linking the same, more particularly relates to a polyether compound which can give an electrolyte which is excellent in shape retention and ion conductivity by cross-linking.

BACKGROUND ART

In the past, to obtain ion conduction between electrodes in secondary cells, fuel cells, dye sensitized solar cells, actuators, and other electrochemical devices, a liquid electrolyte comprised of an electrolytic salt dissolved in a solvent has been used. However, with a liquid electrolyte using a solvent, reduction in the amount of liquid along with time due to evaporation of the solvent or liquid leakage is liable to occur, so development of an alternative electrolyte has been studied.

As an alternative electrolyte to a liquid electrolyte using a solvent, utilization of a nonvolatile ionic liquid has been studied. For example, Patent Document 1 proposes an electrolyte composition which contains an imidazolium compound or a pyridinium compound which has an oligoether group as a substituent. By using such an ionic liquid as an electrolyte, the problem of the reduction in the amount of liquid along with time due to evaporation of the solvent or liquid leakage which is seen in a liquid electrolyte using a solvent can be improved. However, a liquid is still used as the electrolyte, so there are the problems that handling is not easy at the time of production of an electrochemical device and, further, the problem of liquid leakage at the time of use is not completely solved.

Therefore, use of a polymer material which is excellent in ion conductivity as an electrolyte (a so-called "polymer electrolyte") has been studied. For example, Patent Document 2 proposes use, as an electrolyte composition, of a polyether compound which is comprised of a polyalkylene oxide main chain, ionic side chains, and counter ions of ionic side chains wherein the ionic side chains or counter ions exhibit liquid crystallinity. Further, Patent Document 3 proposes a solid electrolyte composition using a polymer compound which has cationic structures at the main chain or side chains and which has halide ions or polyhalide ions as counter anions of the cationic structures. These electrolyte compositions are solid in form exhibiting almost no fluidity in the normal usage environment of the electrolyte, so the problem of liquid leakage at the time of use of the electrochemical device is solved.

However, the electrolyte composition which is described in Patent Document 2 and Patent Document 3 is solid in form, so is inferior in degree of freedom when applied as an electrolyte for an electrochemical device. For example, there was the problem that it was not easy to coat it or impregnate it at other members. For this reason, a material which is excellent in workability to an extent enabling other members to be coated or impregnated and which can give an electrolyte which is prevented from liquid leakage and is excellent in shape retention after being worked has been fervently desired.

PRIOR ART DOCUMENTS

Patent Documents

Patent Document 1: Japanese Patent Publication No. 2001-256828
Patent Document 2: Japanese Patent Publication No. 2002-246066
Patent Document 3: WO2004/112184

SUMMARY OF THE INVENTION

Problem to be Solved by the Invention

The present invention has as its object the provision of a material which is excellent in ion conductivity, which is further excellent in workability, and which can give an electrolyte which is excellent in shape retention after being worked.

Means for Solving the Problems

The inventors engaged in intensive research to achieve the above object and as a result discovered that a composition obtained by blending a cross-linking agent into a polyether compound in which the number of repeating units forming the polyether compound is made a specific range and in which cationic groups and cross-linkable groups are introduced into the repeating units is excellent in workability to an extent enabling other members to be coated or impregnated and that by cross-linking it after working, the shape retention can be improved while maintaining the excellent ion conductivity of the polyether compound. The present invention was completed based on this discovery.

Accordingly, according to the present invention, there is provided a polyether compound containing oxirane monomer units in an average number per molecule of 5 to 200, wherein the polyether compound has cationic groups and cross-linkable groups in the oxirane monomer units.

In the above polyether compound, the compound preferably has oxirane monomer units which have cationic groups and oxirane monomer units which have cross-linkable groups as separate repeating units.

In the above polyether compound, preferably the oxirane monomer units which have cationic groups are repeating units expressed by the following general formula (1):

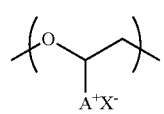

(1)

In the general formula (1), $A^+$ is a group which has an onium cation structure which contains a cationic nitrogen atom and $X^-$ is an anion.

In the above polyether compound, preferably the oxirane monomer units which have cationic groups are repeating units expressed by the following general formula (2):

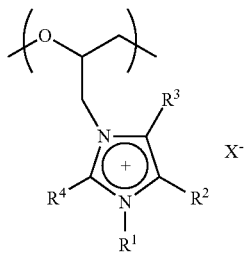

(2)

In the general formula (2), $R^1$ to $R^4$ are respectively independently hydrogen atoms or $C_1$ to $C_{10}$ hydrocarbon groups which may have substituents, while $R^2$ and $R^3$ may be bonded with each other. $X^-$ is an anion.

In the above polyether compound, preferably the oxirane monomer units which have cross-linkable groups are at least one type of monomer units which are selected from allylglycidyl ether units, glycidyl acrylate units, and glycidyl methacrylate units.

Further, according to the present invention, there is provided a cross-linkable composition containing the above polyether compound and a cross-linking agent which enables cross-linking of the cross-linkable groups of the polyether compound.

Furthermore, according to the present invention, there is provided an electrolyte obtained by cross-linking the above cross-linkable composition.

Effects of the Invention

According to the present invention, it is possible to obtain a polyether compound which is excellent in ion conductivity and, furthermore, can give an electrolyte which is excellent in shape retention after being worked.

DESCRIPTION OF EMBODIMENTS

The polyether compound of the present invention is a polyether compound containing oxirane monomer units in an average number per molecule of 5 to 200, wherein the polyether compound has cationic groups and cross-linkable groups in the oxirane monomer units. That is, the polyether compound of the present invention is comprised including oxirane monomer units, obtained by ring-opening polymerization of a compound which contains oxirane structures, in an average number per molecule of 5 to 200, at least part in the oxirane monomer units containing cationic groups and cross-linkable groups.

The number of oxirane units included in the polyether compound of the present invention is an average number per molecule of 5 to 200, preferably 10 to 150, more preferably 10 to 100. If this number is too small, the cross-linking is liable to become insufficient, while if this number is too large, the obtained cross-linked product is liable to become inferior in ion conductivity.

The cationic groups of the polyether compound of the present invention are not particularly limited so long as groups having a cationic property, but ones which have onium cation structures which contain cationic atoms of Group XV or Group XVI of the Periodic Table are preferable, ones which have onium cation structures which contain cationic nitrogen atoms are more preferable, and, among these, ones which have structures where the nitrogen atoms of the nitrogen atom-containing aromatic heterocycles become onium cations are particularly preferable.

The counter anions of the cationic groups are not particularly limited. For example, $Cl^-$, $Br^-$, $I^-$, and other halide ions, $OH^-$, $SCN^-$, $BF_4^-$, $PF_6^-$, $ClO_4^-$, $(FSO_2)_2N^-$, $(CF_3SO_2)_2N^-$, $(CF_3CF_2SO_2)_2N^-$, $CH_3SO_3^-$, $CF_3SO_3^-$, $CF_3COO^-$, and $PhCOO^-$ may be mentioned.

Further, the cross-linkable groups of the polyether compound of the present invention are not particularly limited so long as groups which can form cross-linked structures between molecules due to the action of a cross-linking agent, heat, etc. For example, a vinyl group or allyl group or other ethylenically carbon-carbon unsaturated bond-containing group, a halogen-containing group, epoxy group, carboxyl group, etc. may be mentioned.

The polyether compound of the present invention is not particularly limited in the positional relationship among cationic groups and cross-linkable groups so long as the polyether compound contains both cationic groups and cross-linkable groups in the oxirane monomer units. It may be one which includes oxirane monomer units which have both cationic groups and cross-linkable groups, or one which includes oxirane monomer units which have cationic groups and oxirane monomer units which have cross-linkable groups as separate repeating units. From the viewpoint of making the ion conductivity excellent, it is preferably one which has oxirane monomer units which have cationic groups and oxirane monomer units which have cross-linkable groups as separate repeating units.

When the polyether compound of the present invention has oxirane monomer units which have cationic groups and oxirane monomer units which have cross-linkable groups as separate repeating units, the oxirane monomer units which have cationic groups are not particularly limited, but from the viewpoint of making the ion conductivity excellent, they are preferably the repeating units expressed by the following general formula (1).

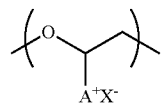

(1)

In the general formula (1), $A^+$ is a group which has an onium cation structure which contains a cationic nitrogen atom, and $X^-$ is an anion.

As specific examples of the group which has an onium cation structure which contains a cationic nitrogen atom expressed by $A^+$ in the general formula (1), an ammonium group, methylammonium group, butylammonium group, cyclohexylammonium group, anilinium group, benzylammonium group, ethanolammonium group, dimethylammonium group, diethylammonium group, dibutylammonium group, nonylphenylammonium group, piperidinium group, trimethylammonium group, triethylammonium group, n-butyldimethylammonium group, n-octyldimethylammonium group, n-stearyldimethylammonium group, tributylammonium group, trivinylammonium group, triethanolammonium group, N,N'-dimethylethanolammonium group, tri(2-ethoxyethyl)ammonium group, or other ammonium group, 1-pyrrolidinium group, imidazolium group, 1-methylimidazolium group, 1-ethylimidazolium group, benzimidazolium group, pyrrolium group, 1-methylpyrrolium group, oxazolium group, benzoxazolium group, benzisoxazolium group, pyrazolium group, isoxazolium group, pyridinium group, 2,6- dimethylpyridinium group, pyrazinium group, pyrimidinium group, pyridazium group, triazium group, N,N'-dimethylanilinium group, quinolinium group, isoquinolinium group, indolium group, isoindolium group, quinoxalium group, thiazolium group, or other group containing a heterocycle which contains a cationic nitrogen atom may be mentioned, but the invention is not limited to these.

The $X^-$ in the general formula (1) expresses an anion and means a counter anion of an onium salt structure which contains a cationic nitrogen atom included in the general formula (1). As specific examples of the anion, ones mentioned as counter anions of the above-mentioned cationic groups may be mentioned. Note that in the repeating units expressed by the general formula (1) in the polyether compound as a whole, all of the anions which are expressed by $X^-$ may be the same type of anions or may be different types of anions mixed.

Further, as preferable examples of the repeating units which are expressed by the general formula (1), the repeating units which are expressed by the following general formula (2) may be mentioned.

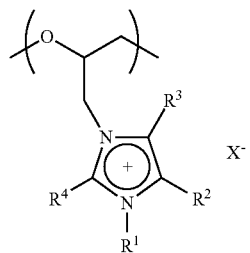

(2)

In the general formula (2), $R^1$ to $R^4$ respectively independently are hydrogen atoms or $C_1$ to $C_{10}$ hydrocarbon groups which may have substituents. $R^2$ and $R^3$ may be bonded with each other. $X^-$ is an anion.

The $R^1$ to $R^4$ in the general formula (2) respectively independently indicate hydrogen atoms or $C_1$ to $C_{10}$ hydrocarbon groups which may have substituents. However, $R^2$ and $R^3$ may be bonded with each other and may form $C_2$ to $C_{20}$ bivalent hydrocarbon groups which may have substituents. As the $C_1$ to $C_{10}$ alkyl groups, a methyl group, ethyl group, propyl group, isopropyl group, etc. may be mentioned, while as the $C_2$ to $C_{20}$ alkylene groups when $R^2$ and $R^3$ are bonded with each other, a 1,2-ethylene group, 1,3-propylene group, 1,4-butylene group, 1,5-pentylene group, 1,6-hexylene group, 1,7-heptylene group, 4-methyl-2,2-pentylene group, 2,3-dimethyl-2,3-butylene group, etc. may be illustrated. The groups represented by $R^1$ to $R^4$ may all be the same groups or may be partially or completely different groups in the same repeating units. Further, the polyether compound may contain a plurality of types of repeating units expressed by the general formula (2) where $R^1$ to $R^4$ differ.

In the general formula (2), $X^-$ indicates an anion and means a counter anion of the imidazolium structure which is included in the general formula (2). As specific examples of the anion, the ones mentioned as counter anions of the above-mentioned cationic groups may be mentioned. Note that, in the repeating units expressed by the general formula (2) in the polyether compound as a whole, all of the anions which are expressed by $X^-$ may be the same type of anions or may be different types of anions mixed.

The ratio of the oxirane monomer units which have cationic groups with respect to the oxirane monomer units which form the polyether compound as a whole is not particularly limited, but is usually 1 to 99 mol %, preferably 20 to 95 mol %. If this ratio is too small, the obtained polyether compound is liable to be inferior in ion conductivity, while if too large, the obtained polyether compound is liable to become hard to cross-link.

Further, when making the oxirane monomer units which have cationic groups and the oxirane monomer units which have cross-linkable groups as separate repeating units, the oxirane monomer units which have cross-linkable groups are not particularly limited. For example, vinylglycidyl ether units, allylglycidyl ether units, glycidyl acrylate units, glycidyl methacrylate units, and other ethylenically unsaturated group-containing epoxide units; butadiene monoepoxide units, chloroprene monoepoxide units, and other diene or polyene monoepoxide units; 1,2-epoxy-5-hexene units and other alkenyl epoxide units etc. may be mentioned. Among these, from the viewpoint of facilitating the synthesis of the polyether compound, ethylenically unsaturated group-containing epoxide units are preferably used. Among these, at least one type of monomer units selected from allylglycidyl ether units, glycidyl acrylate units, and glycidyl methacrylate units are particularly preferably used.

When making the oxirane monomer units which have cationic groups and the oxirane monomer units which have cross-linkable groups as separate repeating units, the polyether compound of the present invention may be comprised of only these repeating units, but may also further include other repeating units than these. As examples of repeating units other than the oxirane monomer units which have cationic groups and the oxirane monomer units which have cross-linkable groups, ethylene oxide units, propylene oxide units, 1,2-butylene oxide units, and other alkylene oxide units which have alkyls, cyclohexene oxide and other oxirane monomer units which have aliphatic cyclic structures, methoxyethoxyethyl-glycidyl ether and other glycidyl ether monomer units which contain ether chains, etc. may be mentioned, but the invention is not limited to these. The ratio of these oxirane monomer units with respect to the oxirane monomer units which form the polyether compound as a whole is not particularly limited, but is usually 99 mol % or lsee and preferably 90 mol % or less.

When the polyether compound of the present invention contains two or more types of oxirane units, the pattern of distribution of these plurality of repeating units is not particularly limited, but they preferably have a random distribution.

The end groups of the polyether compound of the present invention are not particularly limited and may be made any monovalent groups. As specific examples of groups forming the end groups, a hydrogen atom, halogen group, alkyl group, haloalkyl group, hydroxyl group, groups expressed by the following general formula (3) etc. may be mentioned. Among these as well, a polyether compound where one end group is a hydroxyl group and the other end group is a group expressed by the general formula (3) is preferable.

$$-A'^+X'^-  \qquad (3)$$

In the general formula (3), $A'^+$ is a group which has an onium cation structure which contains a cationic nitrogen atom, and $X'^-$ is an anion.

As specific examples of a group which has an onium cation structure which contains a cationic nitrogen atom expressed by $A'^+$ in the general formula (3), the ones mentioned as specific examples of $A^+$ in the general formula (1) may be mentioned.

In the general formula (3), $X'^-$ expresses an anion and means a counter anion of an onium salt structure which contains a cationic nitrogen atom included in the general formula (3). As specific examples of the anion, ones mentioned as counter anions of the above-mentioned cationic groups may be mentioned.

Further, as particularly preferable examples of the groups expressed by the general formula (3), groups expressed by the following general formula (4) may be mentioned.

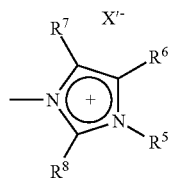

(4)

In the general formula (4), $R^5$ to $R^8$ are respectively independently hydrogen atoms or $C_1$ to $C_{10}$ hydrocarbon groups which may have substituents, and $R^6$ and $R^7$ may be bonded with each other. Further, $X'^-$ is an anion.

In the general formula (4), $R^5$ to $R^8$ respectively independently express hydrogen atoms or $C_1$ to $C_m$ hydrocarbon groups which may have substituents. However, $R^5$ and $R^6$ may be bonded with each other to form bivalent $C_2$ to $C_{20}$ hydrocarbon groups which may have substituents. As specific examples of these groups, ones which were mentioned as specific examples of the groups expressed by $R^1$ to $R^4$ in the general formula (2) may be mentioned.

In the general formula (4), $X'^-$ expresses an anion and means a counter anion of an onium salt structure which contains a cationic nitrogen atom included in the general formula (3). As specific examples of the anion, ones which were mentioned as counter anions of the above-mentioned cationic groups may be mentioned.

The number average molecular weight of the polyether compound of the present invention is not particularly limited so long as the number of the oxirane monomer units is the one explained above, but is preferably 1,000 to 50,000, more preferably 1,000 to 40,000. Further, the molecular weight distribution of the polyether compound, which is found as the ratio of the weight average molecular weight with respect to the number average molecular weight, is also not particularly limited, but 1.0 to 4.0 is preferable, and 1.0 to 2.0 is more preferable.

The method of synthesis of the polyether compound of the present invention is not particularly limited. Any synthesis method may be employed so long as giving the targeted polyether compound. However, from the viewpoint of obtaining the targeted polyether compound more easily, the method of causing a nitrogen-containing compound to react with a polyether compound which contains epichlorohydrin units and oxirane monomer units which have cross-linkable groups so as convert the epichlorohydrin units to onium salt structure-containing oxirane monomer units which contain cationic nitrogen atoms and obtain the targeted polyether compound is suitable.

The polyether compound which contains epichlorohydrin units and oxirane monomer units which have cross-linkable groups may be synthesized by copolymerizing epichlorohydrin and oxirane monomers which have cross-linkable groups in accordance with a known polymerization method so long as the targeted polymerization degree is obtained. Further, to make nitrogen-containing compounds react with the polyether compound which contains epichlorohydrin units and oxirane monomer units which have cross-linkable groups to convert at least part of the polyepichlorohydrin units to onium salt structure-containing oxirane monomer units which contain cationic nitrogen atoms, it is sufficient to apply the known onium reaction. The known onium reaction is disclosed in Japanese Patent Publication No. 50-33271, Japanese Patent Publication No. 51-69434, Japanese Patent Publication No. 52-42481, etc.

To obtain the polyether compound of the present invention, as a particularly suitable method, the method of production of a polyether compound explained next may be mentioned. That is, the method of production of the above-mentioned polyether compound of the present invention is comprised of (1) the step of ring-opening polymerization of a monomer composition which contains epichlorohydrin and an oxirane monomer which has cross-linkable groups at least in part in the presence of a catalyst which contains an onium salt of a compound which contains atoms of Group XV or Group XVI of the Periodic Table and trialkylaluminum where the alkyl groups contained are all linear alkyl groups so as to obtain a polyether compound which contains epichlorohydrin units and oxirane monomer units which have cross-linkable groups and (2) the step of causing the obtained polyether compound to react with the nitrogen-containing compound to obtain a polyether compound which contains onium chloride structure-containing oxirane monomer units and oxirane monomer units which have cross-linkable groups.

The first step in the above method of production of a polyether compound is the step of ring-opening polymerization of a monomer composition which contains epichlorohydrin and an oxirane monomer which has cross-linkable groups at least in part in the presence of a catalyst described in Japanese Patent Publication No. 2010-53217, that is, a catalyst which contains an onium salt of a compound which contains atoms of Group XV or Group XVI of the Periodic Table and trialkylaluminum where the alkyl groups contained are all linear alkyl groups so as to obtain an epichlorohydrin unit-containing polyether compound. The monomer composition which is used need only include an epichlorohydrin and an oxirane monomer which can form the above-mentioned oxirane monomer units which have cross-linkable groups at least in part. In accordance with need, ethylene oxide, propylene oxide, 1,2-butylene oxide, methoxyethoxyethylglycidyl ether, or other copolymerizable monomers may be included.

As the onium salt of the compound which contains atoms of Group XV or Group XVI of the Periodic Table which is used as one of the ingredients of the catalyst, an ammonium salt, pyridinium salt, imidazolium salt, phosphonium salt, arsonium salt, stibonium salt, oxonium salt, sulfonium salt, or selenonium salt may be illustrated. Among these, an ammonium salt, pyridinium salt, imidazolium salt, phosphonium salt, or sulfonium salt is suitably used, an ammonium salt, phosphonium salt, or sulfonium salt is particularly suitably used, and an ammonium salt is most suitably used. Further, among the ammonium salts, tetra-normal butylammonium bromide or tetra-normal butylammonium borohydride is particularly suitable.

The amount of use of the onium salt of the compound which contains atoms of Group XV or Group XVI of the Periodic Table may be determined in accordance with the targeted molecular weight of the polyether-based polymer to be obtained and is not particularly limited. In the method of production of the polyether compound of the present invention, the particularly suitable amount is 0.0005 to 10 mol % with respect to all monomers used.

The trialkylaluminum where the alkyl groups contained are all linear alkyl groups, used as another ingredient of the catalyst, is a compound comprised of aluminum to which three alkyl groups are bonded. It is a compound where the three alkyl groups which bond with aluminum are all linear alkyl groups. For example, methylaluminum, triethylaluminum, and tri-normal octylaluminum may be mentioned. Among these, trimethylaluminum and triethylaluminum are particularly suitably used.

The ratio of use of the onium salt of the compound which contains atoms of Group XV or Group XVI of the Periodic Table and trialkylaluminum where all of the alkyl groups contained are linear alkyl groups is not particularly limited, but the molar ratio of the onium salt:trialkylaluminum is preferably 1:1 to 1:100 in range, more preferably 1.0:1.1 to 1.0:50.0 in range, particularly preferably 1.0:1.2 to 1.0:10.0 in range.

The method of mixing the onium salt of the compound which contains atoms of Group XV or Group XVI of the Periodic Table and trialkylaluminum where all of the alkyl groups contained are linear alkyl groups is not particularly limited, but it is preferable to dissolve or suspend these in a solvent and mix them. The solvent used is not particularly limited, but an inert solvent is preferably used. For example, benzene, toluene, or other aromatic hydrocarbon; n-pentane, n-hexane, or other chain saturated hydrocarbon; cyclopentane, cyclohexane, or other alicyclic hydrocarbon; tetrahydrofuran, anisole, diethylether, or other ether; or these mixed solvents; etc. may be used. The temperature and time when mixing the ingredients of the catalyst are not particularly limited. Mixing them for 10 seconds to 30 minutes under conditions of −30 to 50° C. is preferable.

In the ring-opening polymerization of a monomer composition which contains epichlorohydrin and an oxirane monomer which has cross-linkable groups in the presence of a catalyst comprised of the above two ingredients, the method of mixing the catalyst and the monomer is not particularly limited. For example, the monomer composition may be added to a solvent which contains the catalyst or the catalyst may be added to a solvent which contains the monomer composition. The polymerization scheme is not particularly limited, but from the viewpoint of controlling the polymerization well, the solution polymerization method is preferably used for polymerization. As the solvent, an inert solvent is suitably used. For example, benzene, toluene, or other aromatic hydrocarbon; n-pentane, n-hexane, or other chain saturated hydrocarbon; cyclopentane, cyclohexane, or other alicyclic hydrocarbon; tetrahydrofuran, anisole, diethylether, or other ether; or these mixed solvents; etc. may be used. Among these solvents, from the fact that the polymerization reaction speed becomes faster, non-polar solvents are particularly suitably used. The amount of use of the solvent is not particularly limited, but use so that the concentration of the monomer composition becomes 1 to 50 wt % is preferable and use to 3 to 40 wt % is particularly preferable.

The conditions for the polymerization are not particularly limited and may be suitably selected in accordance with the type of the monomer or catalyst used, the targeted molecular weight, etc. The pressure at the time of polymerization is usually 1 to 500 atm, preferably 1 to 100 atm, particularly preferably 1 to 50 atm. The temperature at the time of polymerization is usually −70 to 200° C., preferably −40 to 150° C., particularly preferably −20 to 100° C. The polymerization time is usually 10 seconds to 100 hours, preferably 20 seconds to 80 hours, particularly preferably 30 seconds to 50 hours.

In the above method of production of a polyether compound, by using a catalyst as explained above which contains an onium salt of a compound which contains atoms of Group XV or Group XVI of the Periodic Table and trialkylaluminum where the alkyl groups contained are all linear alkyl groups, the polymerization reaction proceeds along with the living property, so control of the polymerization becomes easy. As a result, it becomes easy to produce a polyether compound by the desired polymerization degree.

The second step in the method of production of the above polyether compound is a step of making the polyether compound which contains epichlorohydrin units and oxirane monomer units which have cross-linkable groups obtained as explained above react with a nitrogen-containing compound (quaternization reaction) so as to convert the chloro groups of the epichlorohydrin units to onium chloride structure-containing groups to obtain a polyether compound which contains onium chloride structure-containing oxirane monomer units and oxirane monomer units which have cross-linkable groups.

The nitrogen-containing compound which can be used is not particularly limited. As specific examples, ammonia, methylamine, butylamine, cyclohexylamine, aniline, benzylamine, ethanolamine, dimethylamine, diethylamine, dibutylamine, nonylphenylamine, piperidine, trimethylamine, triethylamine, n-butyldimethylamine, n-octyldimethylamine, n-stearyldimethylamine, tributylamine, 1-pyrrolidine, and other aliphatic amine compounds; trivinylamine, N,N'-dimethylaniline, and other amine compounds which have unsaturated bonds; triethanolamine, N,N'-dimethylethanolamine, tri(2-ethoxyethyl)amine, and other aliphatic amine compounds which contain hetero atoms: imidazole, 1-methylimidazole, 1-ethylimidazole, pyrrole, 1-methylpyrrole, thiazole, oxazole, pyrazole, isoxazole, and other five-member heterocyclic compounds; pyridine, pyrazine, pyrimidine, pyridazine, triazine, 2,6-dimethylpyridine, and other six-member heterocyclic compounds; quinoline, isoquinoline, indole, isoindole, benzimidazole, benzoxazole, benzoisoxazole, purine, quinoxaline, quinazoline, cinnoline, and other condensed heterocyclic compounds; etc. may be mentioned.

The method of mixing the polyether compound and nitrogen-containing compound is not particularly limited. For example, the method of adding and mixing a nitrogen-containing compound to a solution which contains a polyether compound, the method of adding and mixing a polyether compound to a solution which contains a nitrogen-containing compound, the method of preparing a nitrogen-containing compound and polyether compound as separate solutions and mixing the two solutions, etc. may be mentioned.

As the solvent, an inert solvent is preferably used. It may be non-polar or polar. As the non-polar solvent, for example, benzene, toluene, or other aromatic hydrocarbon; n-pentane, n-hexane, or other chain saturated hydrocarbon; cyclopentane, cyclohexane, or other alicyclic saturated hydrocarbon; etc. may be mentioned. As polar solvent, tetrahydrofuran, anisole, diethylether, or other ether; ethyl acetate, ethyl benzoate, or other ester; acetone, 2-butanone, acetophenone, or other ketone; acetonitrile, dimethylformamide, dimethylsulfoxide, or other aprotonic polar solvent; ethanol, methanol, water, and other protonic polar solvent; etc. may be mentioned. As the solvent, these mixed solvents may also be suitably used. The amount of use of the solvent is not particularly limited. Use giving a concentration of polyether compounds of 1 to 50 wt % is preferable, while use giving 3 to 40 wt % is more preferable.

The amount of use of the nitrogen-containing compound is not particularly limited and may be suitably selected in accordance with the ratio of content of the onium chloride structure-containing oxirane monomer units of the targeted polyether compound. Specifically, the amount of the nitrogen-containing compound used is usually 0.01 to 100 moles with respect to 1 mole of the epichlorohydrin units of the polyether compound which is used, preferably 0.02 to 50 moles, more preferably 0.03 to 10 moles, furthermore preferably 0.05 to 2 moles in range.

The pressure at the time of reaction of the polyether compound and nitrogen-containing compound is not particularly limited, but is usually 1 to 500 atm, preferably 1 to 100 atm, particularly preferably 1 to 50 atm. The temperature at the time of the reaction is also not particularly limited and is usually 0 to 200° C., preferably 20 to 170° C., more preferably 40 to 150° C. The reaction time is usually 1 minute to 1,000 hours, preferably 3 minutes to 800 hours, more preferably 5 minutes to 500 hours, furthermore preferably 30 minutes to 200 hours.

The above obtained polyether compound which contains onium chloride structure-containing oxirane monomer units which contain cationic nitrogen atoms and oxirane monomer units which have cross-linkable groups can be used as is as the polyether compound of the present invention, but in accordance with need, it is also possible to provide this polyether compound to an anion exchange reaction and exchange the chloride anions of the onium chloride structure with other anions. By performing an anion exchange reaction, the obtained polyether compound can be improved in ion conductivity. The anion exchange reaction may be performed in accordance with an ordinary method, but the method of reaction by bringing a salt of the target anions and metal cations into contact with the polyether compound which contains onium chloride structure-containing oxirane monomer units and oxirane monomer units which have cross-linkable groups is preferable.

The salt of the anions and the metal cations which is used for the anion exchange reaction is a salt of the counter anion ($X^-$) which is contained in the repeating units expressed by the general formula (1) of the targeted polyether compound of the present invention and metal cations and is selected in accordance with the desired counter anions ($X^-$). As specific examples of salts which can be used, potassium bromide (KBr), potassium iodide (KI), potassium hydroxide (KOH), lithium (bistrifluoro-methylsulfone)imide ($Li(CF_3SO_2)_2N$), lithium (bisfluorosulfone)imide ($Li(FSO_2)_2N$), lithium tetrafluoroborate ($LiBF_4$), lithium thiocyanate (LiSCN), lithium hexafluorophosphate ($LiPF_6$), lithium perchlorate ($LiClO_4$), lithium (bispentafluoroethylsulfone)imide ($Li(CF_3CF_2SO_2)_2$N), lithium methylsulfonate ($LiCH_3SO_3$), lithium trifluoromethylsulfonate ($LiCF_3SO_3$), lithium trifluoroacetate ($CF_3COOLi$), lithium benzoate (PhCOOLi), etc. may be mentioned.

The conditions for the anion exchange reaction are not particularly limited. It is possible to mix a polyether compound and salt alone or mix these under conditions of the presence of an organic solvent or other compound. Further, the amount of use of the salt is not particularly limited. It is usually 0.01 to 100 moles with respect to 1 mole of the imidazolium chloride structure of the polyether compound used, preferably 0.02 to 50 moles, more preferably 0.03 to 10 moles in range.

The pressure at the time of the anion exchange reaction is usually 1 to 500 atm, preferably 1 to 100 atm, particularly preferably 1 to 50 atm. The temperature at the time of reaction is usually −30 to 200° C., preferably −15 to 180° C., more preferably 0 to 150° C. The reaction time is usually 1 minute to 1000 hours, preferably 3 minutes to 100 hours, more preferably 5 minutes to 10 hours, furthermore preferably 5 minutes to 3 hours.

After the anion exchange reaction ends, for example, it is sufficient to recover the targeted polyether compound in accordance with drying in vacuo or other ordinary method.

For example, the polyether compound of the present invention which is obtained in the following way has cross-linkable groups, so by making it cross-link to obtain a cross-linked product, the shape retention can be greatly improved. The cross-linking method may be selected in accordance with the type of cross-linkable groups of the polyether compound and is not particularly limited. The method of blending into the polyether compound a cross-linking agent which can cross-link the cross-linkable group of the polyether compound to obtain a cross-linkable composition, then performing a cross-linking reaction by the action of the cross-linking agent is suitable. That is, the cross-linkable composition of the present invention contains the polyether compound of the present invention and a cross-linking agent which can make the cross-linkable groups of the polyether compound cross-link.

As the cross-linking agent which is used in the cross-linkable composition of the present invention, one may be suitably selected in accordance with the type of the cross-linkable group of the polyether compound. As an example of the cross-linking agent which can be used, for example, powdered sulfur, precipitated sulfur, colloidal sulfur, insoluble sulfur, highly dispersed sulfur, and other sulfur; sulfur monochloride, sulfur dichloride, morpholine disulfide, alkylphenol disulfide, dibenzothiazyl sulfide, N,N'-dithio-bis (hexahydro-2H-azepine-2), phosphorus-containing polysulfide, high molecular weight polysulfide, or other sulfur-containing compounds; dicumyl peroxide, ditertiary butylperoxide, or other organic peroxides; p-quinone dioxime, p,p'-dibenzoylquinone dioxime or other quinone oximes; triethylene tetramine, hexamethylenediamine carbamate, 4,4'-methylene bis-o-chloroaniline, or other organic polyvalent amine compounds; s-triazine-2,4,6-trithiol or other triazine-based compounds; alkylphenol resins which have methylol groups; 2-methyl-1-(4-methylthiophenyl)-2-morpholinopropan-1-on or other alkylphenon-type photopolymerization initiators or other various types of UV cross-linking agents etc. may be mentioned. When the cross-linkable group of the polyether compound is an ethylenically carbon-carbon unsaturated bond-containing group, a cross-linking agent which is selected from, among these, sulfur, a sulfur-containing compound, organic peroxide, and a UV cross-linking agent is preferable. Use of an organic peroxide is particularly preferable. These cross-linking agents may be used respectively alone or as two or more types combined. The ratio of content of the cross-linking agent is not particularly limited, but is preferably 0.1 to 10 parts by weight with respect to 100 parts by weight of the polyether compound, more preferably 0.2 to 7 parts by weight, furthermore preferably 0.3 to 5 parts by weight. If the amount of the cross-linking agent is too small, the cross-linking speed is liable to become slower, the productivity of the cross-linked product to fall, and the physical strength of the cross-linked product to become insufficient. On the other hand, if the amount of the cross-linking agent is too great, the obtained cross-linked product is liable to be inferior in performance as an electrolyte.

When using a cross-linking agent comprised of sulfur or a sulfur-containing compound, a cross-linking accelerator aid and a cross-linking accelerator are preferably jointly used. The cross-linking accelerator aid is not particularly limited. For example, zinc white, stearic acid, etc. may be mentioned. The cross-linking accelerator is not particularly limited. For example, a guanidine-based; aldehyde-amine-based; aldehyde-ammonia-based; thiazole-based; sulfenamide-based; thiourea-based; thiuram-based; dithiocarbamate-based; or other cross-linking accelerators may be used. The cross-linking accelerator aid and cross-linking accelerator may be respectively used as single types independently or may be used as two or more types combined.

The amounts of the cross-linking accelerator aid and cross-linking accelerator used are not particularly limited, but 0.01 to 15 parts by weight with respect to 100 parts by weight of the polyether compound is preferable, and 0.1 to 10 parts by weight is more preferable.

The cross-linkable composition of the present invention may further have other ingredients blended into it. As examples of such ingredients, $LiPF_6$, LiTFSI, KI, and other metal salts, water, methanol, ethylene carbonate, and other low molecular weight compounds, ionic liquids, carbon materials, inorganic materials, and other fillers may be mentioned, but the invention is not limited to these.

The above such cross-linkable composition of the present invention is excellent in workability to an extent enabling coating or impregnation of other members. Further, by making it cross-link to obtain a cross-linked product, it may be used as an electrolyte which is excellent in ion conductivity and, furthermore, excellent in shape retention. That is, the electrolyte of the present invention is one obtained by cross-linking the cross-linkable composition of the present invention. The method of cross-linking the cross-linkable composition may be selected in accordance with the type of the cross-linking agent used and is not particularly limited. For example, cross-linking by heating or cross-linking by irradiation by UV may be mentioned. The temperature in the case of cross-linking by heat is not particularly limited. 130 to 200° C. is preferable, while 140 to 200° C. is more preferable. The cross-linking time is also not particularly limited. For example, it may be selected in the range of 1 minute to 5 hours. As the heating method, press heating, oven heating, steam heating, hot air heating, microwave heating, or other method may be suitably selected. In the case of cross-linking by irradiation of UV, a high voltage mercury lamp, metal halide lamp, mercury-xenon lamp, or other light source may be used by an ordinary method to irradiate a cross-linkable composition by UV.

The electrolyte of the present invention which is obtained in the above way is excellent in ion conductivity and furthermore is excellent in shape retention. Therefore, the electrolyte of the present invention may, for example, be suitably used for a secondary cell, fuel cell, dye sensitized solar cell, actuator, or other electrochemical device or other applications.

EXAMPLES

Below, examples and comparative examples will be given to explain the present invention in more detail. Note that, the "parts" and "%" in the examples are based on weight unless otherwise indicated.

The various measurements were performed in accordance with the following methods.

[Number Average Molecular Weight (Mn) and Molecular Weight Distribution (Mw/Mn)]

Gel permeation chromatography (GPC) using dimethylformamide as a solvent was used for measurement as a value converted to polystyrene. Note that, as the measuring device, HLC-8320 (made by Toso) was used. As the column, two TSKgelα-M (made by Toso) were used connected in series. For the detector, a differential refractometer RI-8320 (made by Toso) was used.

[Number of Oxirane Monomer Units (Average Value per Molecule)]

This was calculated based on the results of measurement by $^1$H-NMR using a solvent comprised of chloroform-d or dimethylsulfoxide-d6 and the results of measurement of the number average molecular weight by GPC for a sample oligomer.

[Shape Retention]

A sample was allowed to stand at room temperature (23° C.) in water or tetrahydrofuran. Whether or not the sample is maintained without dissolving after the elapse of 1 hour was used as an indicator of shape retention. A sample which was maintained without dissolving is excellent in shape retention. Note that, when the counter anions of the cationic groups of a polyether compound are chloride ions or hydroxide ions, the sample was allowed to stand in water, while when the counter anions of the cationic groups are (bistrifluoromethylsulfone) imide anions, the sample was allowed to stand in tetrahydrofuran.

[Volume Specific Resistance Value]

For the sample coin shaped cell, as a measuring system, an Impedance Analyzer Model 1260 and Potentiostat Model 1287 (both made by Solartron) were combined for use to measure the volume specific resistance value. Note that the measurement voltage amplitude was 100 mV, the measurement frequency range was 1 MHz to 0.1 Hz, and the measurement was conducted in the test atmosphere of 25° C. using an SUS304 electrode as the main electrode. The lower the volume specific resistance value, the better the ion conductivity.

Production Example 1

Living Anion Copolymerization of Epichlorohydrin and Allylglycidyl Ether

To a glass reactor equipped with a stirrer and with an inside substituted by argon, tetra-normal butylammonium bromide 3.22 g and toluene 50 ml were added and the mixture was cooled to 0° C. Next, triethylaluminum 1.370 g (1.2 equivalents with respect to tetra-normal butylammonium bromide) dissolved in normal hexane 10 ml was added and the reaction caused for 15 minutes to obtain a catalyst composition. To the obtained catalyst composition, epichlorohydrin 9.0 g and allylglycidyl ether 1.0 g were added and the polymerization reaction was performed at 0° C. After the polymerization reaction started, gradually the solution rose in viscosity. After reacting this for 12 hours, a small amount of water was poured into the polymerization reaction solution to make the reaction stop. The obtained polymerization reaction solution was washed by a 0.1N hydrochloric acid aqueous solution so as to remove the catalyst residue and was furthermore washed by ion exchanged water, then the organic phase was dried in vacuo at 50° C. for 12 hours. Due to this, the yield of the obtained colorless, transparent oily substance was 9.9 g. Further, the obtained substance had a number average molecular weight (Mn) by GPC of 1,050 and had a molecular weight distribution (Mw/Mn) of 1.40. Furthermore, the obtained oily substance was measured by $^1$H-NMR, whereupon this oily substance could be confirmed to include epichlorohydrin units 91.7 mol % and allylglycidyl ether units 8.3 mol %. Due to the above, the obtained oily substance can be said to be an oligomer which has bromomethyl groups at the polymerization initiation ends, which has hydroxyl groups at the polymerization termination ends, and which is comprised of epichlorohydrin units and allylglycidyl ether units (11-mer comprised of average 10 epichlorohydrin units and 1 allylglycidyl ether unit).

Production Example 2

Quaternization of Epichlorohydrin Units in Copolymer by 1-Methylimidazole

The oligomer which was obtained in Production Example 1, 5.0 g, 1-methylimidazole 12.1 g, and acetonitrile 10.0 g were added to a glass reactor equipped with a stirrer substituted with argon and were heated to 80° C. After reacting this at 80° C. for 48 hours, the mixture was cooled to room temperature and the reaction was stopped. The obtained reaction product was washed by toluene/methanol/water in an equal weight mixed solution, then the organic phase which contains the 1-methylimidazole and toluene was removed and the aqueous phase was dried in vacuo at 50° C. for 12 hours, whereby a light violet color oily substance 8.9 g was obtained. This oily substance was measured by $^1$H-NMR and analyzed for elements, whereupon it was identified as a polyether compound wherein all of the chloro groups in the epichlorohydrin units in the starting material oligomer were substituted by 1-methylimidazolium chloride groups and all of the bromo groups of the bromomethyl groups of the polymerization initiation ends were substituted by 1-methylimidazolium bromide groups.

Production Example 3

Anion Exchange of Polyether Compound which has 1-Methylimidazolium Chloride Groups by Potassium Hydroxide The polyether compound which was obtained in Production Example 2, 2.5 g, potassium hydroxide 2.0 g, and ion exchanged water 20 ml were added to a glass reactor equipped with a stirrer. The mixture was reacted at room temperature for 30 minutes, then was dried in vacuo at 50° C. for 1 hour, whereby a light violet color oily substance was obtained. The obtained oily substance was dissolved in an methanol/acetone/THF mixed solvent. The remaining crystalline insolubles were dried in vacuo at 50° C. for 1 hour, whereupon a light violet color oily substance was obtained. The obtained solid was dissolved again in a methanol/acetone/THF mixed solvent, the remaining crystalline insolubles were separated, then the result was dried in vacuo at 50° C. for 12 hours, whereupon a light violet color oily substance: 2.0 g was obtained. The obtained oily substance was measured by a Fourier transform IR spectrum and analyzed for elements, whereupon it was identified as an imidazolium structure-containing polyether compound which has counter anions comprised of hydroxide ions wherein all of the chloride ions of the 1-methylimidazolium-chloride groups of the repeating units and the bromide ions of the 1-methylimidazolium bromide groups of the polymerization initiation ends in the starting material polyether compound were exchanged with hydroxide ions.

Production Example 4

Anion Exchange of Polyether Compound which has 1-Methylimidazolium Chloride Groups by Lithium (Bistrifluoromethylsulfone)Imide The polyether compound which was obtained in Production Example 2, 2.5 g, lithium (bistrifluoromethylsulfone) imide 4.1 g, and ion exchanged water 20 ml were added to a glass reactor equipped with a stirrer. The mixture was reacted at room temperature for 30 minutes, then was dried in vacuo at 50° C. for 12 hours. The obtained solid-liquid mixture was washed by water to remove the inorganic salt, then the liquid phase was extracted by toluene. The obtained toluene solution was dried in vacuo at 50° C. for 12 hours, whereupon a very light violet color viscous liquid substance 5.3 g was obtained. The obtained viscous liquid substance was measured by $^1$H-NMR spectrum and analyzed for elements, whereupon it was identified as being an imidazolium structure-containing polyether compound which has counter anions comprised of (bistrifluoromethylsulfone)imide anions wherein all of the chloride ions of the 1-methylimidazolium-chloride groups of the repeating units and bromide ions of the 1-methylimidazoliumbromide groups of the polymerization initiation ends of the starting material polyether compound were exchanged with (bistrifluoromethylsulfone)imide anions.

Production Example 5

Living Anion Copolymerization of Epichlorohydrin and Allylglycidyl Ether

Except for changing the use amount of tetra-normal butylammonium bromide to 0.322 g and the use amount of triethylaluminum to 0.228 g (2.0 equivalents with respect to tetra-normal butylammonium bromide), the same procedure was followed as in Example 1 for a polymerization operation. The yield of the colorless, transparent oily substance which was obtained by this was 9.9 g. Further, the obtained substance had a number average molecular weight (Mn) by GPC of 10,700 and a molecular weight distribution (Mw/Mn) of 1.59. Furthermore, the obtained oily substance was measured for $^1$H-NMR, whereupon this oily substance as confirmed to include epichlorohydrin units 91.7 mol % and allylglycidyl ether units 8.3 mol %. Due to the above, the obtained oily substance can be said to be an oligomer which has bromomethyl groups at the polymerization initiation ends, which has hydroxyl groups at the polymerization termination ends, and is comprised of epichlorohydrin units and allylglycidyl ether units oligomer (114-mer comprising an average 103 epichlorohydrin units and 11 allylglycidyl ether units).

Production Example 6

Except for using, instead of the oligomer which was obtained in Production Example 1, the oligomer which was obtained in Production Example 5, the same procedure was followed as in Production Example 2, whereupon a light violet color high viscosity oily substance 8.8 g was obtained. This high viscosity oily substance was measured by $^1$H-NMR and analyzed for elements, whereupon it was identified as a polyether compound wherein all of the chloro groups in the epichlorohydrin units in the starting material oligomer were substituted by 1-methylimidazolium chloride groups and all of the bromo groups of the bromomethyl groups of the polymerization initiation ends were substituted by 1-methylimidazolium bromide groups.

Production Example 7

Living Anion Copolymerization of Epichlorohydrin and Glycidyl Methacrylate

To a glass reactor equipped with a stirrer and with an inside substituted by argon, tetra-normal butylammonium bromide 3.22 g and toluene 50 ml were added and the mixture cooled to 0° C. Next, triethylaluminum 1.370 g (1.2 equivalents with respect to tetra-normal butylammonium bromide) dissolved in normal hexane 10 ml was added and the reaction caused for 15 minutes to obtain a catalyst composition. To the obtained catalyst composition, epichlorohydrin 9.0 g and glycidyl methacrylate 1.0 g were added and a polymerization reaction was performed at 0° C. After the polymerization started, the solution gradually rose in viscosity. This was reacted for 12 hours, then a small amount of water was poured into the polymerization reaction solution to stop the reaction. The obtained polymerization reaction solution was washed by a 0.1N hydrochloric acid aqueous solution so as to remove the catalyst residue and was furthermore washed by ion exchanged water, then the organic phase was dried in vacuo at 50° C. for 12 hours. Due to this, the yield of the colorless, transparent oily substance which was obtained by this was 9.9 g. Further the obtained substance had a number average molecular weight (Mn) by GPC of 1,100 and a molecular weight distribution of 1.27. Furthermore, the obtained oily substance was measured by $^1$H-NMR, whereupon this oily substance was confirmed to contain epichlorohydrin units 93.2 mol % and glycidyl methacrylate units 6.8 mol %. Due to the above, the obtained oily substance can be said to be an oligomer which has bromomethyl groups at the polymerization initiation ends, which has hydroxyl groups at the polymerization termination ends, and which is comprised of epichlorohydrin units and glycidyl methacrylate units (11-mer comprised of average 10 epichlorohydrin units and 1 glycidyl methacrylate unit).

Production Example 8

Quaternization of Epichlorohydrin Units in Copolymer by 1-Methylimidazole

The oligomer which was obtained in Production Example 7, 5.0 g, 1-methylimidazole 5.0 g, and acetonitrile 10.0 g were added to a glass reactor equipped with a stirrer substituted with argon and heated to 80° C. This was reacted at 80° C. for 72 hours, then was cooled to room temperature and the reaction was stopped. The obtained reaction product was dried in vacuo at 50° C. for 120 hours, whereupon a violet color solid 8.8 g was obtained. This solid was measured by $^1$H-NMR and analyzed for elements, whereupon it was identified as a polyether compound wherein all of the chloro groups in the epichlorohydrin units in the starting material oligomer were substituted by 1-methylimidazolium chloride groups and all of the bromo groups of the bromomethyl groups of the polymerization initiation ends were substituted by 1-methylimidazolium bromide groups.

Production Example 9

Anion Exchange of Polyether Compound which has 1-Methylimidazolium Chloride Groups by Lithium (Bistrifluoromethylsulfone)Imide The polyether compound which was obtained in Production Example 8, 2.5 g, lithium (bistrifluoromethylsulfone) imide 4.1 g, and methanol 20 ml were added to a glass reactor equipped with a stirrer. The mixture was reacted at room temperature for 30 minutes, then was dried in vacuo at 50° C. for 1 hour. The obtained solid-liquid mixture was washed by ion exchanged water to remove the inorganic salt, then was dissolved in acetone. The obtained acetone solution was dried in vacuo at 50° C. for 12 hours, whereupon a very light violet color viscous liquid substance 5.1 g was obtained. The obtained viscous liquid substance was measured by $^1$H-NMR and analyzed for elements, whereupon it was identified as an imidazolium structure-containing polyether compound which has counter anions comprised of (bistrifluoromethylsulfone)imide anions wherein all of the chloride ions of the 1-methylimidazoliumchloride groups of the repeating units and bromide ions of the 1-methylimidazolium bromide groups of the polymerization initiation ends in the starting material polyether compound were exchanged with (bistrifluoromethylsulfone)imide anions.

Production Example 10

Quaternization of Epichlorohydrin Units in Copolymer by Pyridine

The oligomer which was obtained in Production Example 7, 5.0 g, pyridine 8.5 g, and acetonitrile 10.0 g were added to a glass reactor equipped with a stirrer and with an inside substituted by argon and heated to 80° C. This was caused to react at 80° C. for 48 hours, then was cooled to room temperature and the reaction was stopped. The obtained reaction product was dried in vacuo at 50° C. for 120 hours, whereupon a reddish violet color solid 7.7 g was obtained. This solid was measured by $^1$H-NMR and analyzed for elements, whereupon it was identified as a polyether compound wherein 50% of the chloro groups in the epichlorohydrin units in the starting material oligomer were substituted by pyridinium chloride groups and all of the bromo groups of the bromomethyl groups of the polymerization initiation ends were substituted by the pyridinium bromide groups.

Production Example 11

Anion Exchange of Polyether Compound which has Pyridinium Chloride Groups by Lithium (Bistrifluoromethylsulfone)Imide The polyether compound which was obtained in Production Example 10, 2.5 g, lithium (bistrifluoromethylsulfone) imide 4.1 g, and methanol 20 ml were added to a glass reactor equipped with a stirrer. The mixture was reacted at room temperature for 30 minutes, then was dried in vacuo at 50° C. for 1 hour. The obtained solid-liquid mixture was washed by ion exchanged water to remove the inorganic salt, then was dissolved in acetone. The obtained acetone solution was dried in vacuo at 50° C. for 12 hours, whereupon a very light reddish violet viscous liquid substance 4.0 g was obtained. The obtained viscous liquid substance was measured by $^1$H-NMR and analyzed for elements, whereupon it was identified as an imidazolium structure-containing polyether compound which has counter anions comprised of (bistrifluoromethylsulfone)imide anions wherein all of the chloride ions of the pyridinium chloride groups of the repeating units and bromide ions of the pyridinium bromide groups in the polymerization initiation ends of the starting material polyether compound were exchanged with (bistrifluoromethylsulfone) imide anions.

Production Example 12

Quaternization of Epichlorohydrin Units in Copolymer by Quinoline

The oligomer which was obtained in Production Example 7, 5.0 g, quinoline 7.5 g, and acetonitrile 10.0 g were added to a glass reactor equipped with a stirrer and with an inside substituted by argon and heated to 80° C. After reaction at 80° C. for 48 hours, the mixture was cooled to room temperature and the reaction was stopped. The obtained reaction product was dried in vacuo at 50° C. for 120 hours, whereupon a violet color solid 5.5 g was obtained. This solid was measured by $^1$H-NMR and analyzed for elements, whereupon it was identified as a polyether compound wherein 10% of the chloro groups in the epichlorohydrin units in the starting material oligomer were substituted by quinolinium chloride group and all of the bromo groups of the bromomethyl groups of the polymerization initiation ends were substituted by quinolinium bromide groups.

Production Example 13

Anion Exchange of Polyether Compound which has Quinolinium Chloride Groups by Lithium (Bistrifluoromethylsulfone)Imide The polyether compound which was obtained in Production Example 12, 2.5 g, lithium (bistrifluoromethylsulfone)imide 4.1 g, and methanol 20 ml were added to a glass reactor equipped with a stirrer. The mixture was reacted at room temperature for 30 minutes, then was dried in vacuo at 50° C. for 1 hour. The obtained solid-liquid mixture was washed by ion exchanged water to remove the inorganic salt, then was dissolved in acetone. The obtained acetone solution was dried in vacuo at 50° C. for 12 hours, whereupon a very light violet viscous liquid substance 3.0 g was obtained. The obtained viscous liquid substance was measured by $^1$H-NMR and analyzed for elements, whereupon it was identified as an imidazolium structure-containing polyether compound which has counter anions comprised of (bistrifluoromethylsulfone)imide anions wherein all of the chloride ions of the quinolinium chloride groups of the repeating units and the bromide ions of the quinolinium bromide groups of the polymerization initiation ends in the starting material polyether compound were exchanged with bistrifluoromethylsulfone)imide anions.

Production Example 14

Quaternization of Epichlorohydrin Units in Copolymer by Normal Butyldimethylamine The oligomer which was obtained in Production Example 7, 5.0 g, normal butyldimethylammonium 10.9 g, and acetonitrile 10.0 g were added to a glass reactor equipped with a stirrer and with an inside substituted by argon and heated to 80° C. This was reacted at 80° C. for 48 hours, then was cooled to room temperature and the reaction was stopped. The obtained reaction product was dried in vacuo at 50° C. for 120 hours, whereupon an orange color solid 7.8 g was obtained. This solid was measured by $^1$H-NMR and analyzed for elements, whereupon it was identified as a polyether compound wherein 70% of the chloro groups in the epichlorohydrin units in the starting material oligomer were substituted by normal butyldimethylammonium chloride groups and all of the bromo groups of the bromomethyl groups of the polymerization initiation ends were substituted by normal butyldimethylammonium bromide groups.

Production Example 15

The polyether compound which was obtained in Production Example 14, 2.5 g, lithium (bistrifluoromethylsulfone)imide 4.1 g, and methanol 20 ml were added to a glass reactor equipped with a stirrer. The mixture was reacted at room temperature for 30 minutes, then was dried in vacuo at 50° C. for 1 hour. The obtained solid-liquid mixture was washed by ion exchanged water to remove the inorganic salt, then was dissolved in acetone. The obtained acetone solution was dried in vacuo at 50° C. for 12 hours, whereupon a very light orange color viscous liquid substance 4.5 g was obtained. The obtained viscous liquid substance was measured by $^1$H-NMR and analyzed for elements, whereupon it was identified as a normal butyldimethylammonium structure-containing polyether compound which has counter anions comprised of (bistrifluoromethylsulfone)imide anions wherein all of the chloride ions of the normal butyldimethylammonium chloride groups of the repeating units and the bromide ions of the normal butyldimethyl ammonium bromide groups of the polymerization initiation ends in the starting material polyether compound were exchanged with (bistrifluoromethylsulfone)imide anions.

Production Example 16

Quaternization of Epichlorohydrin Units in Copolymer by 1-Methylpyrrolidine

The oligomer which was obtained in Production Example 7, 5.0 g, 1-methylpyrrolidine 9.2 g, and acetonitrile 10.0 g were added to a glass reactor equipped with a stirrer and with an inside substituted by argon and heated to 80° C. After reacting this at 80° C. for 48 hours, the mixture was cooled to room temperature and the reaction was stopped. The obtained reaction product was dried in vacuo at 50° C. for 120 hours, whereupon a reddish orange color solid 9.5 g was obtained. This solid was measured by $^1$H-NMR and analyzed for elements, whereupon it was identified as a polyether compound wherein all of the chloro groups in the epichlorohydrin units in the starting material oligomer were substituted by 1-methylpyrrolidinium chloride groups and all of the bromo groups of the bromomethyl groups of the polymerization initiation ends were substituted by 1-methylpyrrolidinium bromide groups.

Production Example 17

Anion Exchange of Polyether Compound which has 1-Methylpyrrolidinium Chloride Groups by Lithium (Bistrifluoromethylsulfone)Imide The polyether compound which was obtained in Production Example 16, 2.5 g, lithium (bistrifluoromethylsulfone)imide 4.1 g, and methanol 20 ml were added to a glass reactor equipped with a stirrer. The mixture was reacted at room temperature for 30 minutes, then was dried in vacuo at 50° C. for 1 hour. The obtained solid-liquid mixture was washed by ion exchanged water to remove the inorganic salt, then was dissolved in acetone. The obtained acetone solution was dried in vacuo at 50° C. for 12 hours, whereupon a very light reddish orange color viscous liquid substance 4.5 g was obtained. The obtained viscous liquid substance was measured by $^1$H-NMR and analyzed for elements, whereupon it was identified as a 1-methylpyrrolidinium structure-containing polyether compound which has counter anions comprised of (bistrifluoromethylsulfone)imide anions wherein all of the chloride ions of the 1-methylpyrrolidinium chloride groups of the repeating units and the bromide ions of the 1-methylpyrrolidinium bromide groups of the polymerization initiation ends in the starting material polyether compound were exchanged with (bistrifluoromethylsulfone)imide anions.

Production Example 18

Synthesis of 2-(2-methoxyethoxy)ethylglycidyl ether

To a glass reactor equipped with a stirrer and with an inside substituted by argon, 2-(2-methoxyethoxy)ethanol 50.0 g, 50% sodium hydroxide aqueous solution 100 ml, and toluene 100 ml were added and were cooled to 0° C. Next, tetra-normal butylammonium bromide 13.4 g and epibromohydrin 85.5 g were added, then the mixture was reacted at 20° C. After 12 hours reaction, the organic phase was washed by saturated saline, was dried over magnesium sulfate, then was dried in vacuo at 50° C. for 3 hours. Due to this, a yellow color transparent liquid 43.0 g was obtained. The obtained yellow color transparent liquid was distilled using calcium hydride to obtain a colorless, transparent liquid. The obtained colorless, transparent liquid was measured by $^1$H-NMR, whereupon the liquid was identified as being the target 2-(2-methoxyethoxy)ethylglycidyl ether.

Production Example 19

(Living Anion Copolymerization of Epichlorohydrin, 2-(2-Methoxyethoxy)Ethylglycidyl Ether, and Glycidyl Methacrylate)

To a glass reactor equipped with a stirrer and with an inside substituted by argon, tetra-normal butylammonium bromide 3.22 g and toluene 50 ml were added and were cooled to 0° C. Next, triethylaluminum 1.370 g (1.2 equivalents with respect to tetra-normal butylammonium bromide) dissolved in normal hexane 10 ml was added and a reaction caused for 15 minutes to obtain a catalyst composition. To the obtained catalyst composition, epichlorohydrin 5.0 g, the 2-(2-methoxyethoxy)ethylglycidyl ether which was obtained in Production Example 18, 4.0 g, and glycidyl methacrylate 1.0 g were added and the mixture was reacted for polymerization at 0° C. After the polymerization reaction started, gradually the solution rose in viscosity. After reaction for 12 hours, a small amount of water was poured into the polymerization reaction solution to stop the reaction. The obtained polymerization reaction solution was washed by a 0.1N hydrochloric acid aqueous solution so as to remove the catalyst residue and was furthermore washed by ion exchanged water, then the organic phase was dried in vacuo at 50° C. for 12 hours. The yield of the colorless, transparent oily substance which was obtained by this was 9.9 g. Further, the obtained substance had a number average molecular weight (Mn) by GPC of 1,200 and a molecular weight distribution of 1.37. Furthermore, the obtained oily substance was measured by $^1$H-NMR, whereupon this oily substance was confirmed to include epichlorohydrin units 64.5 mol %, methoxyethoxyethylglycidyl ether units 27.1 mol %, and glycidyl methacrylate units 8.4 mol %. Due to the above, the obtained oily substance can be said to be an oligomer which has bromomethyl groups at the polymerization initiation ends, which has hydroxyl groups at the polymerization termination ends, and which is comprised of epichlorohydrin units, methoxyethoxyethylglycidyl ether units, and glycidyl methacrylate units (10-mer comprised of average 6 epichlorohydrin units, 3 methoxyethoxyethylglycidyl ether units, and 1 glycidyl methacrylate unit).

Production Example 20

Quaternization of Epichlorohydrin Units in Copolymer by 1-Methylimidazole

The oligomer which was obtained in Production Example 19, 5.0 g, 1-methylimidazole 7.3 g, and acetonitrile 10.0 g were added to a glass reactor equipped with a stirrer and with an inside substituted by argon and heated to 80° C. The mixture was caused to react at 80° C. for 72 hours, then was cooled to room temperature and the reaction was stopped. The obtained reaction product was dried in vacuo at 50° C. for 120 hours, whereupon a violet colored solid 7.5 g was obtained. This solid was measured by $^1$H-NMR and analyzed for elements, whereupon it was identified as a polyether compound wherein all of the chloro groups in the epichlorohydrin units in the starting material oligomer were substituted by 1-methylimidazolium chloride groups and all of the bromo groups of the bromomethyl groups of the polymerization initiation ends were substituted by 1-methylimidazolium bromide groups.

Production Example 21

Anion Exchange of Polyether Compound which has 1-Methylimidazolium Chloride Groups by Lithium (Bistrifluoromethylsulfone)Imide The polyether compound which was obtained in Production Example 20, 2.5 g, lithium (bistrifluoromethylsulfone)imide 4.1 g, and methanol 20 ml were added to a glass reactor equipped with a stirrer. This was reacted at room temperature for 30 minutes, then was dried in vacuo at 50° C. for 1 hour. The obtained solid-liquid mixture was washed by ion exchanged water to remove the inorganic salt, then was dissolved in acetone. The obtained acetone solution was dried in vacuo at 50° C. for 12 hours, whereupon a very light violet color viscous liquid substance 4.0 g was obtained. The obtained viscous liquid substance was measured by $^1$H-NMR and analyzed for elements, whereupon it was identified as an imidazolium structure-containing polyether compound which has counter anions comprised of (bistrifluoromethylsulfone)imide anions wherein all of the chloride ions of the 1-methylimidazolium chloride groups of the repeating units and bromide ions of the 1-methylimidazolium bromide groups of the polymerization initiation ends in the starting material polyether compound were exchanged with (bistrifluoromethylsulfone)imide anions.

Production Example 22

Living Anion Copolymerization of Epichlorohydrin and Allylglycidyl Ether

Except for changing the use amount of triethylaluminum to 1.484 g (1.3 equivalents with respect to tetra-normal butylammonium bromide), changing the use amount of epichlorohydrin to 8.0 g, and changing the use amount of allylglycidyl ether to 2.0 g respectively, the same procedure was followed as in Production Example 1 to obtain a colorless, transparent oily substance in a yield of 9.9 g. The obtained substance had a number average molecular weight (Mn) of GPC 1,100 and a molecular weight distribution (Mw/Mn) of 1.45. Furthermore, the obtained oily substance was measured by $^1$H-NMR, whereupon this oily substance could be confirmed to include epichlorohydrin units 83.2 mol % and allylglycidyl ether units 16.8 mol %. Due to the above, the obtained oily substance can be said to be an oligomer which has bromomethyl groups at the polymerization initiation ends, which has hydroxyl groups at the polymerization termination ends, and is comprised of epichlorohydrin units and allylglycidyl ether units (11-mer comprised of an average 9 epichlorohydrin units and 2 allylglycidyl ether units).

Production Example 23

Quaternization of Epichlorohydrin Units in Copolymer by 1-Methylimidazole

The oligomer which was obtained in Production Example 22, 5.0 g, 1-methylimidazole 12.1 g, and acetonitrile 10.0 g were added to a glass reactor equipped with a stirrer and with an inside substituted by argon and heated to 80° C. After reacting this at 80° C. for 48 hours, the result was cooled to room temperature and the reaction was stopped. The obtained reaction product was washed by toluene/methanol/water in an equal weight mixed solution, then the organic phase containing the 1-methylimidazole and toluene was removed and the aqueous phase was dried in vacuo at 50° C. for 12 hours, whereupon a light violet color oily substance 8.2 g was obtained. This oily substance was measured by $^1$H-NMR and analyzed for elements, whereupon it was identified as a polyether compound wherein all of the chloro groups of the epichlorohydrin units in the starting material oligomer were substituted by 1-methylimidazolium chloride groups and all of the bromo groups of the bromomethyl groups of the polymerization initiation ends were substituted by 1-methylimidazolium bromide groups.

Production Example 24

Living Anion Copolymerization of Epichlorohydrin and Glycidyl Methacrylate

Except for changing the use amount of epichlorohydrin to 7.0 g and using, instead of allylglycidyl ether, glycidyl methacrylate 3.0 g, the same procedure was followed as in Production Example 22 to obtain a colorless, transparent oily substance in a yield of 9.9 g. The obtained substance had a number average molecular weight (Mn) by GPC of 1,100 and a molecular weight distribution (Mw/Mn) of 1.40. Furthermore, the obtained oily substance was measured by $^1$H-NMR, whereupon this oily substance was confirmed to include epichlorohydrin units 78.2 mol % and glycidyl methacrylate units 21.8 mol %. Due to the above, the obtained oily substance can be said to be an oligomer which has bromomethyl groups at the polymerization initiation ends, has hydroxyl groups at the polymerization termination ends, and is comprised of epichlorohydrin units and glycidyl methacrylate units (11-mer comprised of average 9 epichlorohydrin units and 2 glycidyl methacrylate units).

Production Example 25

Quaternization of Epichlorohydrin Units in Copolymer by 1-Methylimidazole

The oligomer which was obtained in Production Example 24, 5.0 g, 1-methylimidazole 12.1 g, and acetonitrile 10.0 g were added to a glass reactor equipped with a stirrer and with an inside substituted by argon and heated to 80° C. After reacting this at 80° C. for 48 hours, the mixture was cooled to room temperature and the reaction was stopped. The obtained reaction product was washed by toluene/methanol/water in an equal weight mixed solution, then the organic phase including the 1-methylimidazole and toluene was removed and the aqueous phase was dried in vacuo at 50° C. for 12 hours, whereupon a light violet color oily substance 8.2 g was obtained. This oily substance was measured by $^1$H-NMR and analyzed for elements, whereupon it was identified as a polyether compound wherein all of the chloro groups of the epichlorohydrin units in the starting material oligomer were substituted by 1-methylimidazolium chloride groups and all of the bromo groups of the bromomethyl groups of the polymerization initiation ends were substituted by 1-methylimidazolium bromide groups.

Production Example 26

Living Anion Copolymerization of Epichlorohydrin and Glycidyl Methacrylate

Except for changing the use amount of tetra-normal butylammonium bromide to 0.322 g and the use amount of triethylaluminum to 0.228 g (2.0 equivalents with respect to tetra-normal butylammonium bromide) respectively, the same procedure was followed as in Production Example 24 for the polymerization operation. The yield of the colorless, transparent oily substance which was obtained due to this was 9.9 g. Further, the obtained substance had a number average molecular weight (Mn) by GPC of 11,300 and a molecular weight distribution (Mw/Mn) of 1.51. Furthermore, the obtained oily substance was measured by $^1$H-NMR, whereupon this oily substance was confirmed to include the epichlorohydrin units 78.2 mol % and glycidyl methacrylate units 21.8 mol %. Due to the above, the obtained oily substance can be said to be an oligomer which has bromomethyl groups at the polymerization initiation ends, which has hydroxyl groups at the polymerization termination ends, and which is comprised of epichlorohydrin units and glycidyl methacrylate units (109-mer comprising an average 85 epichlorohydrin units and 24 glycidyl methacrylate units).

Production Example 27

Quaternization of Epichlorohydrin Units in Copolymer by 1-Methylimidazole

The oligomer which was obtained in Production Example 26, 5.0 g, 1-methylimidazole 12.1 g, and acetonitrile 10.0 g were added to a glass reactor equipped with a stirrer and with an inside substituted by argon and heated to 80° C. This was reacted at 80° C. for 48 hours, then was cooled to room temperature and the reaction was stopped. The obtained reaction product was washed by toluene/methanol/water in an equal weight mixed solution, then the organic phase including the 1-methylimidazole and toluene was removed and the aqueous phase was dried in vacuo at 50° C. for 12 hours, whereupon a light violet color oily substance 8.2 g was obtained. This oily substance was measured by $^1$H-NMR and analyzed for elements, whereupon it was identified as a polyether compound wherein all of the chloro groups of the epichlorohydrin units of the starting material oligomer were substituted by 1-methylimidazolium chloride groups and all of the bromo groups of the bromomethyl groups of the polymerization initiation ends were substituted by 1-methylimidazolium bromide groups.

Comparative Production Example 1

Living Anion Polymerization of Epichlorohydrin

To a glass reactor equipped with a stirrer and with an inside substituted by argon, tetra-normal butylammonium bromide 3.22 g and toluene 50 ml were added. The mixture was cooled to 0° C. Next, triethyl aluminum 1.256 g (1.1 equivalents with respect to tetra-normal butylammonium bromide) dissolved in normal hexane 10 ml was added. The mixture was reacted for 15 minutes to obtain a catalyst composition. To the obtained catalyst composition, epichlorohydrin 10.0 g was added and a polymerization reaction was performed at 0° C. After the polymerization reaction started, the solution gradually rose in viscosity. After reaction for 12 hours, a small amount of water was poured into the polymerization reaction solution to stop the reaction. The obtained polymerization reaction solution was washed by a 0.1N hydrochloric acid aqueous solution so as to remove the catalyst residue and was furthermore washed by ion exchanged water, then the organic phase was dried in vacuo at 50° C. for 12 hours. The yield of the colorless, transparent oily substance which was obtained due to this was 9.9 g. Further, the obtained substance had a number average molecular weight (Mn) by GPC of 1,050 and a molecular weight distribution (Mw/Mn) of 1.35. Due to the above, the obtained oily substance can be said to be an oligomer of epichlorohydrin (average 11-mer) which has bromomethyl groups at the polymerization initiation ends and has hydroxyl groups at the polymerization termination ends.

Comparative Production Example 2

Quaternization of Oligomer of Epichlorohydrin by 1-Methylimidazole

The oligomer of the epichlorohydrin which was obtained in Comparative Production Example 1, 5.0 g, 1-methylimidazole 12.1 g, and acetonitrile 10.0 g were added to a glass reactor equipped with a stirrer and with an inside substituted by argon and heated to 80° C. This was reacted at 80° C. for 48 hours, then was cooled to room temperature and the reaction was stopped. The obtained reaction product was washed by toluene/methanol/water in an equal weight mixed solution, then the organic phase including the 1-methylimidazole and toluene was removed and the aqueous phase was dried in vacuo at 50° C. for 12 hours, whereupon a light red color solid 9.4 g was obtained. This solid was measured by $^1$H-NMR and analyzed for elements, whereupon it was identified as a polyether compound wherein all of the chloro groups of the epichlorohydrin units of the starting material oligomer were substituted by 1-methylimidazolium chloride groups and all of the bromo groups of the bromomethyl groups of the polymerization initiation ends were substituted by 1-methylimidazolium bromide groups.

Comparative Production Example 3

Anion Exchange of Polyether Compound which has 1-Methylimidazolium Chloride Groups by Lithium (Bistrifluoromethylsulfone)Imide The polyether compound which has 1-methylimidazolium chloride groups which was obtained in Comparative Production Example 2, 2.5 g, lithium (bistrifluoromethylsulfone) imide 4.1 g, and ion exchanged water 20 ml were added to a glass reactor equipped with a stirrer. This was reacted at room temperature for 30 minutes, then was dried in vacuo at 50° C. for 12 hours. The obtained solid-liquid mixture was washed with water to remove the inorganic salt, then the liquid phase was extracted by toluene. The obtained toluene solution was dried in vacuo at 50° C. for 12 hours, whereupon a substantially colorless, transparent, viscous liquid substance 5.7 g was obtained. The obtained viscous liquid substance was measured by $^1$H-NMR spectrum and analyzed for elements, whereupon it was identified as an imidazolium structure-containing polyether compound which has counter anions comprised of (bistrifluoromethylsulfone)imide anions wherein all of the chloride ions of the 1-methylimidazolium chloride groups of the repeating units and the bromide ions of the 1-methylimidazolium bromide groups of the polymerization initiation ends in the starting material polyether compound were exchanged with (bistrifluoromethylsulfone)imide anions.

Comparative Production Example 4

Living Anion Copolymerization of Epichlorohydrin and Propylene Oxide

Except for using, instead of epichlorohydrin 10.0 g, epichlorohydrin 6.0 g and propylene oxide 4.0 g in mixture, the same procedure was followed as in Comparative Production Example 1 for a polymerization operation. The yield of the colorless, transparent oily substance which was obtained by this was 9.8 g. Further, the obtained substance had a number average molecular weight (Mn) by GPC of 1,200 and a molecular weight distribution (Mw/Mn) of 1.20. Furthermore, the obtained oily substance was measured by $^1$H-NMR, whereupon this oily substance could be confirmed to include epichlorohydrin units 50 mol % and propylene oxide units 50 mol %. Due to the above, the obtained oily substance can be said to be an oligomer which has bromomethyl groups at the polymerization initiation ends, which has hydroxyl groups at the polymerization termination ends, and which is comprised of epichlorohydrin units and propylene oxide units (16-mer comprised of average 8 epichlorohydrin units and 8 propylene oxide units).

Comparative Production Example 5

Quaternization of Epichlorohydrin Units in Copolymer by 1-Methylimidazole

Except for using, instead of the oligomer of the epichlorohydrin which was obtained in Comparative Production Example 1, 5.0 g, the oligomer which was obtained in Comparative Production Example 4, the same procedure was followed as in Comparative Production Example 2, whereupon a light red color powdery solid 6.7 g was obtained. This solid was measured by $^1$H-NMR and analyzed for elements, whereupon it was identified as a polyether compound wherein all of the chloro groups in the epichlorohydrin units of the starting material oligomer were substituted by 1-methylimidazolium chloride groups and all of the bromo groups of the bromomethyl groups of the polymerization initiation ends were substituted by 1-methylimidazolium bromide groups.

Comparative Production Example 6

Anion Exchange of Polyether Compound which has 1-Methylimidazolium Chloride Groups by Potassium Hydroxide Except for using, instead of the polyether compound which was obtained in Production Example 2, the polyether compound which was obtained in Comparative Production Example 5, the same procedure was followed as in Production Example 3, whereupon a colorless, transparent viscous liquid substance 2.1 g was obtained. The obtained viscous liquid substance was measured by a Fourier transform IR spectrum and analyzed for elements, whereupon it was identified as an imidazolium structure-containing polyether compound which has counter anions comprised of hydroxide ions wherein all of the chloride ions of the 1-methylimidazolium chloride groups of the repeating units and 50 mol % of the bromide ions of the 1-methylimidazolium bromide groups of the polymerization initiation ends in the starting material polyether compound were exchanged with hydroxide ions.

Comparative Production Example 7

Production of High Molecular Weight Copolymer by Living Anion Copolymerization of Epichlorohydrin and Allylglycidyl Ether Except for changing the use amount of the tetra-normal butylammonium bromide to 0.032 g and changing the use amount of triethylaluminum to 0.023 g (2.0 equivalents with respect to tetra-normal butylammonium bromide), the same procedure was followed as in Production Example 1 for a polymerization operation. The yield of the rubbery substance which was obtained by this was 9.9 g. Further, the number average molecular weight (Mn) by GPC of the obtained substance was 98,500, and the molecular weight distribution (Mw/Mn) was 1.45. Furthermore, the obtained oily substance was measured by $^1$H-NMR, whereupon this oily substance could be confirmed to include epichlorohydrin units 90 mol % and allylglycidyl ether units 10 mol %. Due to the above, the obtained oily substance can be said to be a high molecular weight copolymer which has bromomethyl groups at the polymerization initiation end, which has hydroxyl groups at the polymerization termination ends, and which is comprised of epichlorohydrin units and allylglycidyl ether units (1030-mer comprised of average 930 epichlorohydrin units and 100 allylglycidyl ether units).

Comparative Production Example 8

Quaternization of Epichlorohydrin Units in High Molecular Weight Copolymer by 1-Methylimidazole Except for using, instead of the oligomer of epichlorohydrin which was obtained in Comparative Production Example 1, the high molecular weight copolymer which was obtained in Comparative Production Example 7, 5.0 g and changing the use amount of 1-methylimidazole to 24.2 g and the reaction time to 240 hours respectively, the same procedure was performed as in the Comparative Production Example 2, whereupon a rubbery solid 9.4 g was obtained. The rubbery solid was measured by $^1$H-NMR, whereupon it was identified as a high molecular weight polyether compound where all of the chloro groups in the starting material high molecular weight copolymer were substituted by 1-methylimidazolium chloride groups and all of the bromo groups of the bromomethyl groups of the polymerization initiation ends were substituted by 1-methylimidazolium bromide groups.

Comparative Production Example 9

Anion Exchange of High Molecular Weight Polyether Compound which has 1-Methylimidazolium Chloride Groups by Lithium (Bistrifluoromethylsulfone)Imide Except for using as the polyether compound which has 1-methylimidazolium chloride groups, instead of the one obtained in Comparative Production Example 2, the high molecular weight polyether compound which was obtained in the Comparative Production Example 8, 2.5 g, the same procedure was performed as in the Comparative Production Example 3, whereupon a colorless, transparent hard rubbery solid 5.7 g was obtained. The obtained rubbery solid was measured by $^1$H-NMR, whereupon it was identified as an imidazolium structure-containing polyether compound which has counter anions comprised of (bistrifluoromethylsulfone)imide anions wherein all of the chloride ions of the 1-methylimidazolium chloride groups of the repeating units and bromide ions of the 1-methylimidazolium bromide groups of the polymerization initiation ends in the starting material high molecular weight polyether compound were exchanged with (bistrifluoromethylsulfone) imide anions.

Example 1

The polyether compound which was obtained in Production Example 2, 100 parts and a cross-linking agent comprised of dicumyl peroxide (made by NOF Corporation, "PERCUMYL D-40") 3 parts were stirred under a 25° C., humidity 60% atmosphere by an automatic mortar for 10 minutes. The obtained composition was a uniform thin violet colored oily composition. This composition was worked into a diameter 12 mm, thickness 200 micron thin columnar shape. This was held in a 160° C. oven for 20 minutes for a cross-linking reaction, whereupon the composition became a rubbery cross-linked product. This cross-linked product was subjected to a shape retention test, whereupon it could retain its shape in water. Further, this cross-linked product was inserted in a coin shaped cell and shaped under a 25° C., humidity 60% atmosphere. When measured for volume specific resistance value, it was $10^{2.20}$ (Ω/cm). The composition of repeating units of the polyether compound used, the composition of the cross-linkable composition, the results of the shape retention test, and the volume specific resistance value are shown together in Table 1.

TABLE 1

| | Examples | | | | |
|---|---|---|---|---|---|
| | 1 | 2 | 3 | 4 | 5 |
| Polyether compound | Prod. Ex. 2 | Prod. Ex. 3 | Prod. Ex. 4 | Prod. Ex. 5 | Prod. Ex. 2 |
| Number of oxirane monomer units which form polyether compound (average) | 11 | 11 | 11 | 114 | 11 |
| Composition of monomer units of polyether compound (mol %) | | | | | |
| Repeating units expressed by general formula (1) | 91.7 | 91.7 | 91.7 | 91.7 | 91.7 |
| Allyglycidyl ether units | 8.3 | 8.3 | 8.3 | 8.3 | 8.3 |
| Glycidyl methacrylate units | — | — | — | — | — |

TABLE 1-continued

|  | | | | | |
|---|---|---|---|---|---|
| Cationic groups of repeating units expressed by general formula (1) | Imidazolium group | Imidazolium group | Imidazolium group | Imidazolium group | Imidazolium group |
| Type of anions of counter anions of repeating units expressed by general formula (1) | Cl$^-$ | OH$^-$ | (CF$_3$SO$_2$)$_2$N$^-$ | Cl$^-$ | Cl$^-$ |
| Cross-linking agent | Peroxide | Peroxide | Peroxide | Peroxide | UV cross-linking agent |
| Shape retention | Excellent | Excellent | Excellent | Excellent | Excellent |
| Common log of volume specific resistance value (Ω/cm) | 2.20 | 1.95 | 2.45 | 2.95 | 2.25 |

|  | Examples | | | | |
|---|---|---|---|---|---|
|  | 6 | 7 | 8 | 9 | 10 |
| Polyether compound | Prod. Ex. 2 | Prod. Ex. 4 | Prod. Ex. 4 | Prod. Ex. 8 | Prod. Ex. 8 |
| Number of oxirane monomer units which form polyether compound (average) | 11 | 11 | 11 | 11 | 11 |
| Composition of monomer units of polyether compound (mol %) | | | | | |
| Repeating units expressed by general formula (1) | 91.7 | 91.7 | 91.7 | 93.2 | 93.2 |
| Allyglycidyl ether units | 8.3 | 8.3 | 8.3 | 8.3 | 8.3 |
| Glycidyl methacrylate units | — | — | — | 6.8 | 6.8 |
| Cationic groups of repeating units expressed by general formula (1) | Imidazolium group | Imidazolium group | Imidazolium group | Imidazolium group | Imidazolium group |
| Type of anions of counter anions of repeating units expressed by general formula (1) | Cl$^-$ | (CF$_3$SO$_2$)$_2$N$^-$ | (CF$_3$SO$_2$)$_2$N$^-$ | Cl$^-$ | Cl$^-$ |
| Cross-linking agent | Sulfur | Peroxide | UV cross-linking agent | Peroxide | UV cross-linking agent |
| Shape retention | Excellent | Excellent | Excellent | Excellent | Excellent |
| Common log of volume specific resistance value (Ω/cm) | 2.05 | 2.75 | 2.90 | 2.30 | 2.43 |

Examples 2 to 4

Except for using, instead of the polyether compound which was obtained in Production Example 2, the polyether compounds which were obtained in Production Example 3, Production Example 4, and Production Example 6 in respectively 100 parts, the same procedure was followed as in Example 1 to prepare the compositions, perform cross-linking reactions, run shape retention tests, and measure the volume specific resistance values. The compositions of repeating units of the polyether compounds used, the compositions of the cross-linkable compositions, the results of the shape retention tests, and the volume specific resistance value are shown together in Table 1.

Example 5

Except for using as the cross-linking agent, instead of dicumyl peroxide, 2-methyl-1-(4-methylthiophenyl)-2-morpholinopropan-1-on (made by BASF, "Irgacure 907") 3 parts and causing the cross-linking reaction by irradiating the composition by UV instead of heating, the same procedure was followed as in Example 1 to prepare the composition, perform the cross-linking reaction, run the shape retention test, and measure the volume specific resistance value. The composition of repeating units of the polyether compound used, the composition of the cross-linkable composition, the results of the shape retention test, and the volume specific resistance value are shown together in Table 1.

Example 6

Except for using as the cross-linking agent, instead of dicumyl peroxide, sulfur 0.5 part and further mixing morpholine disulfide 1 part, tetraethylthiuram disulfide 1 part, dibenzothiazyl disulfide 1.5 part, and stearic acid 0.5 part, the same procedure was followed as in Example 1 to prepare the composition, perform the cross-linking reaction, run the shape retention test, and measure the volume specific resistance value. The composition of repeating units of the polyether compound used, the composition of the cross-linkable composition, the results of the shape retention test, and the volume specific resistance value are shown together in Table 1.

Example 7

The polyether compound which was obtained in Production Example 4, 100 parts and a cross-linking agent comprised of dicumyl peroxide (made by NOF Corporation, "PERCUMYL D-40") 3 parts were stirred under a 25° C., humidity 60% atmosphere by an automatic mortar for 10 minutes. The obtained composition was a uniform light violet colored oily composition. This composition was impregnated in a thickness 100 micron PTFE porous film. Two were superposed and worked into a diameter 12 mm, thickness 200 micron thin columnar shape. This was held in a 160° C. oven for 20 minutes for a cross-linking reaction, whereupon the composition became a rubbery cross-linked product which would never leak out from the PTFE porous film. This cross-linked product was subjected to a shape retention test, whereupon it could retain its shape in tetrahydrofuran. Further, this cross-linked product was inserted in a coin shaped cell and shaped under a 25° C., humidity 60% atmosphere. When measured for volume inherent resistance value, it was $10^{2.75}$ (Ω/cm). The composition of repeating units of the polyether compound used, the composition of the cross-linkable composition, the results of the shape retention test, and the volume inherent resistance value are shown together in Table 1.

Example 8

The polyether compound which was obtained in Production Example 4, 100 parts, a cross-linking agent comprised of 2-methyl-1-(4-methylthiophenyl)-2-morpholinopropan-1- on (made by Ciba Specialty Chemicals, "Irgacure 907") 3 parts, and THF 50 parts were stirred under a 25° C., humidity 60% atmosphere by an automatic mortar for 10 minutes. The obtained composition was a light violet colored oily composition. This composition was impregnated in a titanium oxide layer coated on a glass substrate. The THF was removed by casting, whereupon a titanium oxide layer on which a oily composition was coated was formed. This was irradiated by UV, whereupon the previously oily composition became a rubbery cross-linked product. This cross-linked product was subjected to a shape retention test, whereupon it could retain its shape in tetrahydrofuran. Further, this cross-linked product was inserted in a coin-shaped cell and shaped in a 25° C., humidity 60% atmosphere. When measured for volume specific resistance value, it was $10^{2.90}$ ($\Omega$/cm). The composition of repeating units of the polyether compound used, the composition of the cross-linkable composition, the results of the shape retention test, and the volume specific resistance value are shown together in Table 1.

Example 9

Except for using, instead of the polyether compound obtained in Production Example 2, the polyether compound obtained in Production Example 8 in 100 parts, the same procedure was followed as in Example 1 to prepare the composition, perform the cross-linking reaction, run the shape retention test, and measure the volume specific resistance value. The composition of repeating units of the polyether compound used, the composition of the cross-linkable composition, the results of the shape retention test, and the volume specific resistance value are shown together in Table 1.

Example 10

Except for using as a cross-linking agent, instead of dicumyl peroxide, 2-methyl-1-(4-methylthiophenyl)-2-morpholinopropan-1-on (made by BASF, "Irgacure 907") 3 parts, and causing the cross-linking reaction by irradiating the composition with UV instead of heating it, the same procedure was followed as in Example 9 to prepare the composition, perform the cross-linking reaction, run the shape retention test, and measure the volume specific resistance value. The composition of repeating units of the polyether compound used, the composition of the cross-linkable composition, the results of the shape retention test, and the volume specific resistance value are shown together in Table 1.

Example 11

Except for using, instead of the polyether compound which was obtained in Production Example 8, the polyether compound which was obtained in Production Example 9 in 100 parts, the same procedure was followed as in Example 9 to prepare the composition, perform a cross-linking reaction, run a shape retention test, and measure the volume specific resistance value. The composition of repeating units of the polyether compound used, the composition of the cross-linkable composition, the results of the shape retention test, and the volume specific resistance value are shown together in Table 2.

TABLE 2

|  | Examples | | | | |
| --- | --- | --- | --- | --- | --- |
|  | 11 | 12 | 13 | 14 | 15 |
| Polyether compound | Prod. Ex. 8 | Prod. Ex. 9 | Prod. Ex. 10 | Prod. Ex. 11 | Prod. Ex. 12 |
| Number of oxirane monomer units which form polyether compound (average) | 11 | 11 | 11 | 11 | 11 |
| Composition of monomer units of polyether compound (mol %) | | | | | |
| Repeating units expressed by general formula (1) | 93.2 | 93.2 | 45.6 | 46.8 | 9.3 |
| Allyglycidyl ether units | 6.8 | 6.8 | 6.8 | 6.8 | 6.8 |
| Glycidyl methacrylate units | — | — | 46.6 | 46.6 | 83.9 |
| Cationic groups of repeating units expressed by general formula (1) | Imidazolium group | Imidazolium group | Pyridinium group | Pyridinium group | Quinolinium group |
| Type of anions of counter anions of repeating units expressed by general formula (1) | $(CF_3SO_2)_2N^-$ | $(CF_3SO_2)_2N^-$ | $Cl^-$ | $(CF_3SO_2)_2N^-$ | $Cl^-$ |
| Cross-linking agent | Peroxide | UV cross-linking agent | Peroxide | Peroxide | Peroxide |
| Shape retention | Excellent | Excellent | Excellent | Excellent | Excellent |
| Common log of volume specific resistance value ($\Omega$/cm) | 2.67 | 2.59 | 4.47 | 4.69 | 4.91 |

|  | Examples | | | | |
| --- | --- | --- | --- | --- | --- |
|  | 16 | 17 | 18 | 19 | 20 |
| Polyether compound | Prod. Ex. 13 | Prod. Ex. 14 | Prod. Ex. 15 | Prod. Ex. 16 | Prod. Ex. 17 |
| Number of oxirane monomer units which form polyether compound (average) | 11 | 11 | 11 | 11 | 11 |
| Composition of monomer units of polyether compound (mol %) | | | | | |
| Repeating units expressed by general formula (1) | 9.3 | 65.2 | 65.2 | 93.2 | 93.2 |
| Allyglycidyl ether units | 6.8 | 6.8 | 6.8 | 6.8 | 6.8 |
| Glycidyl methacrylate units | 83.9 | 28.0 | 28.0 | — | — |
| Cationic groups of repeating units expressed by general formula (1) | Quinolinium group | Ammonium group | Ammonium group | Pyrrolidinium group | Pyrrolidinium group |
| Type of anions of counter anions of repeating units expressed by general formula (1) | $(CF_3SO_2)_2N^-$ | $Cl^-$ | $(CF_3SO_2)_2N^-$ | $Cl^-$ | $(CF_3SO_2)_2N^-$ |

TABLE 2-continued

| | | | | | |
|---|---|---|---|---|---|
| Cross-linking agent | Peroxide | Peroxide | Peroxide | Peroxide | Peroxide |
| Shape retention | Excellent | Excellent | Excellent | Excellent | Excellent |
| Common log of volume specific resistance value (Ω/cm) | 4.98 | 3.92 | 3.98 | 2.84 | 3.06 |

Example 12

Except for using as a cross-linking agent instead of dicumyl peroxide, 2-methyl-1-(4-methylthiophenyl)-2-morpholinopropan-1-on (made by BASF, "Irgacure 907") 3 parts, and causing the cross-linking reaction by irradiating the composition with UV instead of heating it, the same procedure was followed as in Example 11 to prepare the composition, perform the cross-linking reaction, run the shape retention test, and measure the volume specific resistance value. The composition of repeating units of the polyether compound used, the composition of the cross-linkable composition, the results of the shape retention test, and the volume specific resistance value are shown together in Table 2.

Examples 13 to 20, 21, 22, 23, 25, and 27

Except for using, instead of the polyether compound which was obtained in Production Example 2, the polyether compounds which were obtained in Production Examples 10 to 17, 20, 21, 23, 25, and 27 in respectively 100 parts, the same procedure was followed as in Example 9 to prepare the compositions, perform cross-linking reactions, run shape retention tests, and measure the volume specific resistance values. The compositions of repeating units of the polyether compounds used, the compositions of cross-linkable compositions, the results of the shape retention tests, and the volume specific resistance values are shown together in Table 2 and Table 3.

TABLE 3

| | Examples | | | | | |
|---|---|---|---|---|---|---|
| | 21 | 22 | 23 | 24 | 25 | 26 |
| Polyether compound | Prod. Ex. 20 | Prod. Ex. 21 | Prod. Ex. 22 | Prod. Ex. 23 | Prod. Ex. 25 | Prod. Ex. 26 |
| Number of oxirane monomer units which form polyether compound (average) | 10 | 10 | 11 | 11 | 11 | 11 |
| Composition of monomer units of polyether compound (mol %) | | | | | | |
| Repeating units expressed by general formula (1) | 64.5 | 64.5 | 83.2 | 83.2 | 78.2 | 78.2 |
| Allyglycidyl ether units | — | — | 16.5 | 16.8 | — | — |
| Glycidyl methacrylate units | 8.4 | 8.4 | — | — | 21.8 | 21.8 |
| Methoxyethoxyethylglycidyl ether units | 27.1 | 27.1 | — | — | — | — |
| Propylene oxide units | — | — | — | — | — | — |
| Cationic groups of repeating units expressed by general formula (1) | Imidazolium group | Imidazolium group | Imidazolium group | Imidazolium group | Imidazolium group | Imidazolium group |
| Type of anions of counter anions of repeating units expressed by general formula (1) | Cl$^-$ | $(CF_3SO_2)_2N^-$ | Cl$^-$ | Cl$^-$ | Cl$^-$ | Cl$^-$ |
| Cross-linking agent | Peroxide | Peroxide | Peroxide | UV cross-linking agent | Peroxide | UV cross-linking agent |
| Shape retention | Excellent | Excellent | Excellent | Excellent | Excellent | Excellent |
| Common log of volume specific resistance value (Ω/cm) | 3.58 | 3.83 | 2.91 | 2.96 | 3.32 | 3.49 |

| | Examples | Comparative Examples | | | |
|---|---|---|---|---|---|
| | 27 | 1 | 2 | 3 | 4 |
| Polyether compound | Prod. Ex. 27 | Comp. Prod. Ex. 2 | Comp. Prod. Ex. 3 | Comp. Prod. Ex. 6 | Comp. Prod. Ex. 9 |
| Number of oxirane monomer units which form polyether compound (average) | 108 | 11 | 11 | 16 | 1030 |
| Composition of monomer units of polyether compound (mol %) | | | | | |
| Repeating units expressed by general formula (1) | 78.2 | 100 | 100 | 50 | 90 |
| Allyglycidyl ether units | — | — | — | — | 10 |
| Glycidyl methacrylate units | 21.8 | — | — | — | — |
| Methoxyethoxyethylglycidyl ether units | — | — | — | — | — |
| Propylene oxide units | — | — | — | 90 | — |
| Cationic groups of repeating units expressed by general formula (1) | Imidazolium group | Imidazolium group | Imidazolium group | Imidazolium group | Imidazolium group |
| Type of anions of counter anions of repeating units expressed by general formula (1) | Cl$^-$ | Cl$^-$ | $(CF_3SO_2)_2N^-$ | OH$^-$ | $(CF_3SO_2)_2N^-$ |
| Cross-linking agent | Peroxide | Peroxide | Peroxide | Peroxide | Peroxide |
| Shape retention | Excellent | No good (Unshapable) | No good (Unshapable) | No good (Unshapable) | Excellent |
| Common log of volume specific resistance value (Ω/cm) | 3.89 | | | | 6.50 |

Examples 24 and 26

Except for using, instead of the polyether compound which was obtained in Production Example 8, the polyether compounds which were obtained in Production Examples 23 and 25 in respectively 100 parts, the same procedure was followed as in Example 10 to prepare the compositions, perform cross-linking reactions, run shape retention tests, and measure the volume specific resistance values. The compositions of repeating units of the polyether compounds used, the compositions of cross-linkable compositions, the results of the shape retention tests, and the volume specific resistance values are shown together in Table 3.

Comparative Examples 1 to 4

Except for using, instead of the polyether compound which was obtained in Production Example 2, the polyether compounds which were obtained in Comparative Production Example 2, Comparative Production Example 3, Comparative Production Example 6, and Comparative Production Example 9 in respectively 100 parts, the same procedure was followed as in Example 1 to prepare the compositions, perform cross-linking reactions, run shape retention tests, and measure the volume specific resistance values. The compositions of repeating units of the polyether compounds used, the compositions of cross-linkable compositions, the results of the shape retention tests, and the volume specific resistance values are shown together in Table 3. Note that the compositions of Comparative Examples 1 to 3 remained oily even if used for cross-linking reactions and were inferior in shape retention. Further, they could not be used for coin shaped cells and could not be measured for volume specific resistance values.

As will be understood from the results which are shown in Tables 1 to 3, the polyether compound of the present invention gives an electrolyte which is high in shape retention and is excellent in ion conductivity by addition of a cross-linking agent to cause cross-linking (Examples 1 to 27). Further, before cross-linking, it is also excellent in workability enabling a porous film to be impregnated (Example 7) and a titanium oxide layer to be coated (Example 8). On the other hand, even if polyether compounds which have cationic groups but do not have cross-linkable groups are used for cross-linking reactions, the compounds are inferior in shape retention (Comparative Examples 1 to 3). Further, even if a polyether compound which has cationic groups and cross-linkable groups, a compound which is too high in polymerization degree of oxirane monomer units can only give an electrolyte which is inferior in ion conductivity even if cross-linked (Comparative Example 4).

The invention claimed is:

1. A polyether compound containing oxirane monomer units in an average number per molecule of 10 to 200, wherein the polyether compound has one or more oxirane monomer units which have one or more cationic groups and one or more oxirane monomer units which have one or more cross-linkable groups as separate repeating units,
wherein the oxirane monomer units which have one or more cross-linkable groups are one or more ethylenically unsaturated group-containing epoxide units.

2. The polyether compound as set forth in claim 1, wherein the oxirane monomer units which have one or more cationic groups are one or more repeating units expressed by the following general formula (1):

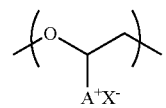

(1)

wherein A+ is a group which has an onium cation structure which contains a cationic nitrogen atom and X− is an anion.

3. The polyether compound as set forth in claim 1, wherein the oxirane monomer units which have one or more cationic groups are one or more repeating units expressed by the following general formula (2):

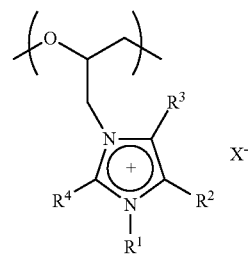

(2)

wherein $R^1$ to $R^4$ are respectively independently hydrogen atoms or $C_1$ to $C_{10}$ hydrocarbon groups which may have substituents, while $R^2$ and $R^3$ may be bonded with each other, $X^-$ is an anion.

4. The polyether compound as set forth in claim 1, wherein the ethylenically unsaturated group-containing epoxide units are at least one type of monomer units which are selected from allylglycidyl ether units, glycidyl acrylate units, and glycidyl methacrylate units.

5. A cross-linkable composition containing a polyether compound as set forth in claim 1 and a cross-linking agent which enables cross-linking of the cross-linkable groups of said polyether compound.

6. An electrolyte obtained by cross-linking the cross-linkable composition as set forth in claim 5.

* * * * *